United States Patent
Rasmussen et al.

(10) Patent No.: US 10,196,548 B2
(45) Date of Patent: Feb. 5, 2019

(54) OXALATE ESTER—POLYAMINE THERMOSETTING COMPOSITIONS

(71) Applicant: 3M INNOVATIVE PROPERTIES COMPANY, St. Paul, MN (US)

(72) Inventors: Jerald K. Rasmussen, Woodville, WI (US); Döne Demirgöz, St. Paul, MN (US); Taylor M. Christian, St. Paul, MN (US); Cary A. Kipke, Austin, TX (US); Nicole Morozowich Beveridge, Stillwater, MN (US); Andrew P. Klein, St. Paul, MN (US); David S. Hays, Woodbury, MN (US); James P. DiZio, St. Paul, MN (US); George W. Griesgraber, Eagan, MN (US); Robert A. Asmus, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/781,851

(22) PCT Filed: Dec. 13, 2016

(86) PCT No.: PCT/US2016/066333
§ 371 (c)(1),
(2) Date: Jun. 6, 2018

(87) PCT Pub. No.: WO2017/112457
PCT Pub. Date: Jun. 29, 2017

(65) Prior Publication Data
US 2018/0355230 A1 Dec. 13, 2018

Related U.S. Application Data

(60) Provisional application No. 62/270,768, filed on Dec. 22, 2015.

(51) Int. Cl.
| | | |
|---|---|---|
| *C09J 133/14* | (2006.01) | |
| *C09J 4/06* | (2006.01) | |
| *C09J 11/06* | (2006.01) | |
| *C08F 18/22* | (2006.01) | |
| *C08F 224/00* | (2006.01) | |

(52) U.S. Cl.
CPC ............... *C09J 133/14* (2013.01); *C09J 4/06* (2013.01); *C09J 11/06* (2013.01); *C08F 18/22* (2013.01); *C08F 224/00* (2013.01); *C08F 2500/02* (2013.01)

(58) Field of Classification Search
CPC .................................................. C09J 133/14
See application file for complete search history.

(56) References Cited

U.S. PATENT DOCUMENTS

| | | |
|---|---|---|
| 4,119,615 A | 10/1978 | Schulze |
| 4,218,351 A | 8/1980 | Rasmussen |
| 4,414,250 A | 11/1983 | Costanza |
| 4,619,979 A | 10/1986 | Kotnour |
| 4,684,710 A | 8/1987 | Schimmel |
| 4,843,134 A | 6/1989 | Kotnour |
| 5,008,137 A | 4/1991 | Nugent, Jr. |
| 5,081,197 A | 1/1992 | Heilmann |
| 5,140,057 A | 8/1992 | Saeki |
| 5,391,633 A | 2/1995 | Saeki |
| 5,637,646 A | 6/1997 | Ellis |
| 5,804,610 A | 9/1998 | Hamer |
| 5,986,011 A | 11/1999 | Ellis |
| 6,635,690 B2 | 10/2003 | Heilmann |
| 6,677,402 B2 | 1/2004 | Gaddam |
| 7,501,184 B2 | 3/2009 | Leir |
| 7,851,574 B2 | 12/2010 | Dollase |
| 8,137,807 B2 | 3/2012 | Clapper |
| 8,729,197 B2 | 5/2014 | Kropp |
| 9,217,050 B2 | 12/2015 | Fornof |
| 2011/0237725 A1 | 9/2011 | Clapper |
| 2012/0142848 A1 | 6/2012 | Bzowej |
| 2012/0289736 A1 | 11/2012 | Yang |
| 2013/0260137 A1* | 10/2013 | Akiyama ............... C09J 133/02 428/327 |
| 2014/0050872 A1 | 2/2014 | Leir |
| 2015/0057428 A1 | 2/2015 | Iyer |

FOREIGN PATENT DOCUMENTS

| | | |
|---|---|---|
| WO | WO 2002/094890 | 11/2002 |
| WO | WO 2002/102909 | 12/2002 |
| WO | WO 2006/024669 | 3/2006 |
| WO | WO 2011/119363 | 9/2011 |
| WO | WO 2012/088126 | 6/2012 |
| WO | WO 2017/112456 | 6/2017 |

OTHER PUBLICATIONS

International Search Report for PCT International Application No. PCT/US2016/066333, dated Mar. 14, 2017, 5 pages.

* cited by examiner

*Primary Examiner* — Daniel H Lee
(74) *Attorney, Agent, or Firm* — Jean A. Lown

(57) ABSTRACT

Polymeric materials are disclosed herein that include a reaction product of components comprising: a) a first amine component having at least two and at most three primary amino groups, secondary amino groups, or a mixture thereof, with the proviso that the first amine component is not a silicone diamine; b) a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms; and c) an oxalate ester.

15 Claims, No Drawings

OXALATE ESTER—POLYAMINE THERMOSETTING COMPOSITIONS

CROSS REFERENCE TO RELATED APPLICATIONS

This application is a national stage filing under 35 U.S.C. 371 of PCT/US2016/066333, filed Dec. 13, 2016, which claims the benefit of U.S. Provisional Application No. 62/270,768, filed Dec. 22, 2015, the disclosure of which is incorporated by reference in its/their entirety herein.

BACKGROUND

Polymers have been widely investigated in the coatings industry for a number of applications, such as adhesives, sealants, clear coats, powder coats, and low adhesion backings. With appropriate choice of polymer backbone, polymers can be applied to a wide variety of surfaces. Although thermosetting compositions have been used as coatings and/or adhesives for a wide variety of these applications, many known thermosetting compositions lack desirable properties for at least some of these applications. For example, many thermosetting compositions require a solvent, which would make the use of such a composition undesirable for applications such as skin or tissue adhesives.

The use of topical skin adhesives for medical closures continues to grow. Compared to conventional closure techniques such as sutures and staples, topical skin adhesives offer potential benefits to medical professionals. Exemplary benefits of using topical skin adhesives include a potential reduction in the time required to close an incision or laceration, and less skin trauma, which can result in an improved cosmetic outcome.

Current skin adhesive products are typically cyanoacrylate-based adhesives. Cyanoacrylate-based skin adhesive products generally consist of liquid monomers, do not contain solvent, and require no mixing prior to application. Cyanoacrylate monomers can polymerize in the presence of nucleophiles (e.g., hydroxide ion), and the polymerization is not inhibited by oxygen. The rate of polymerization can vary based on a number of factors including, for example, the moisture content of the environment, and the characteristics of the skin (e.g., nucleophile content of the skin). The polymerization rate can generally be accelerated by exposure of cyanoacrylate-based adhesives to additional nucleophiles such as amines. Although cyanoacrylate-based adhesives can provide materials with high tensile strength and high shear strength, the lack of elasticity and flexibility has practically limited the use of cyanoacrylate-based adhesives to incisions that are not under high tension. The use of cyanoacrylate-based adhesives in surgical procedures has also been limited by variable cure time and high cost.

There is a continuing need for rapidly curing thermosetting adhesives, particularly adhesives that can be formulated with minimal or no solvent.

SUMMARY

In one aspect, the present disclosure provides a polymeric material comprising a reaction product of components comprising: a) a first amine component having at least two and at most three primary amino groups, secondary amino groups, or a mixture thereof, with the proviso that the first amine component is not a silicone diamine; b) a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms; and c) a compound of Formula (IV):

$$R^4O-(CO)-(CO)-OR^4 \qquad (IV),$$

wherein each $R^4$ is independently alkyl, substituted alkyl, aralkyl, substituted aralkyl, alkenyl, aryl, or substituted aryl; wherein the polymeric material is a crosslinked polyoxalamide having oxalamido linkages of the formula $-NR^5-(CO)-(CO)-NR^5-$ in the crosslinked chains, wherein each $R^5$ is independently H, alkyl, substituted alkyl, alkylene, aralkyl, substituted aralkyl, alkenyl, aryl, or substituted aryl; and wherein an equivalent weight ratio of the total of the primary and/or secondary amines of the first amine component and the primary amines of the second amine component to the oxalate ester is in a range of 0.8 to 1.2. The present disclosure also provides an adhesive composition comprising the polymeric material described herein.

In another aspect, the present disclosure provides a two-part reactive composition comprising: a) a first part comprising an oxalamido-containing compound and a compound of Formula (IV); wherein the oxalamido-containing compound has at least two groups of the formula $-NR^5-(CO)-(CO)-OR^4$, wherein each $R^4$ is independently alkyl, substituted alkyl, aralkyl, substituted aralkyl, alkenyl, aryl, or substituted aryl; wherein each $R^5$ is independently H, alkyl, substituted alkyl, alkylene, aralkyl, substituted aralkyl, alkenyl, aryl, or substituted aryl; wherein the groups of the formula $-NR^5-(CO)-(CO)-OR^4$ are the reaction products of a first amine component with a compound of Formula (IV); wherein the first amine component has at least two and at most three primary amino groups, secondary amino groups, or a mixture thereof; wherein the oxalamido-containing compound is free of a siloxane segment; and wherein the compound of Formula (IV) is of the formula:

$$R^4O-(CO)-(CO)-OR^4 \qquad (IV),$$

wherein each $R^4$ is independently alkyl, substituted alkyl, aralkyl, substituted aralkyl, alkenyl, aryl, or substituted aryl; and b) a second part comprising a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms. In some embodiments, the first part is present in a first chamber of a multi-chambered mixing and/or dispensing device, and the second part is present in a second chamber of a multi-chambered mixing and/or dispensing device.

In another aspect, the present disclosure provides a multi-chambered mixing and/or dispensing device containing the two-part reactive composition described herein, wherein the first part is present in a first chamber of the multi-chambered mixing and/or dispensing device, and the second part is present in a second chamber of the multi-chambered mixing and/or dispensing device.

In another aspect, the present disclosure provides a method of preparing a polymeric material comprising: providing a two-part reactive composition as described herein; and combining the first part and the second part under conditions effective for the reaction of the first part and the second part to form the polymeric material.

In another aspect, the present disclosure provides a polymeric material preparable by a method described herein. In some embodiments, the polymeric material is prepared by a method described herein.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain situations by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also, as used herein in connection with a measured quantity, the term "approximately" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "substituted alkyl" refers to an alkyl substituted with halo, haloalkyl, alkoxy, heteroatoms, or alkoxycarbonyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "substituted aralkyl" refers to an aralkyl substituted with halo, alkyl, haloalkyl, alkoxy, heteroatoms, or alkoxycarbonyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "substituted aryl" refers to an aryl substituted with halo, alkyl, haloalkyl, alkoxy, heteroatoms, or alkoxycarbonyl.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

As used herein, the term "room temperature" refers to a temperature of 20° C. to 25° C., or more often to a temperature of 21° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

Disclosed herein are rapidly curing thermosetting polyamides formed from the reaction of polyamines with oxalate esters. In certain embodiments, a combination of short-chain and long-chain amines (e.g., diamines or triamines), along with a polyamine component, can be used to prepare crosslinked polymeric materials having a wide range of properties that can range from soft and tacky materials to tough and leathery materials. These polymeric materials can have a variety of uses as coatings and adhesives.

In one aspect, the present disclosure provides a polymeric material comprising a reaction product of components comprising: a) a first amine component having at least two and at most three primary amino groups, secondary amino groups, or a mixture thereof, with the proviso that the first amine component is not a silicone diamine; b) a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms; and c) a compound of Formula (IV):

$$R^4O-(CO)-(CO)-OR^4 \quad (IV),$$

wherein each $R^4$ is independently alkyl, substituted alkyl, aralkyl, substituted aralkyl, alkenyl, aryl, or substituted aryl; wherein the polymeric material is a crosslinked polyoxalamide having oxalamido linkages of the formula $-NR^5-(CO)-(CO)-NR^5-$ in the crosslinked chains, wherein each $R^5$ is independently H, alkyl, substituted alkyl, alkylene, aralkyl, substituted aralkyl, alkenyl, aryl, or substituted aryl, and wherein an equivalent weight ratio of the total of the primary and/or secondary amines of the first amine component and the primary amines of the second amine component to the oxalate ester is in a range of 0.8 to 1.2. The present disclosure also provides an adhesive composition comprising the polymeric material described herein.

First Amine Component

The polymeric materials disclosed herein include a first amine component having at least two and at most three primary amino groups, secondary amino groups, or a mixture thereof, with the proviso that the first amine component is not a silicone diamine. Optionally, the first amine component can further include one or more tertiary amino groups. The first amine component can include one or more C2-C48 or higher straight chain or cyclic amines (e.g., diamines, triamines, oligomeric and/or polymeric diamines, and oligomeric and/or polymeric triamines) that may optionally include heteroatoms. The amounts of the first amine component can be selected such that an equivalent weight ratio of the total of the primary and/or secondary amines of the first amine component and the primary amines of the second amine component to the oxalate ester is in a range of 0.8 to 1.2.

In certain embodiments, the first amine component can include one or more short chain (e.g., C2-C16) amines, one or more long chain (e.g., C17-C48 or higher) amines, or a mixture of short chain (e.g., C2-C16) and long chain (e.g., C17-C48 or higher) amines. In certain embodiments, the short chain amines (e.g., diamines or triamines) can act as hard segments to impart crystallinity and hydrogen bonding capabilities to the polymeric composition. In certain embodiments, the long chain amines (e.g., diamines or triamines) can impart increased toughness, increased flexibility, and increased hydrophobic character to the polymeric materials. For certain applications, increased hydrophobic character can be advantageous to prevent swelling in the presence of aqueous fluids, for example, bodily fluids such as blood when used as a topical skin adhesive.

A wide variety of short chain (e.g., C2-C16) amines can be used for embodiments in which the first amine component includes one or more short chain amines. Exemplary short chain amines include, but are not limited to, ethylene diamine, 1,2-propanediamine, 1,3-propanediamine, 1,4-butanediamine, 1,6-hexanediamine, 1,8-octanediamine, 1,12-dodecanediamine, methylenebiscyclohexylamine, m- and p-xylylenediamine, bis(aminomethyl)cyclohexane, piperazine, isophoronediamine, N-(2-aminoethyl)piperazine, N,N'-bis(3-aminopropyl)piperazine, tris(2-aminoethyl)amine, 3,3'-diaminodipropylether, 1,13-diamino-4,7,10-trioxatridecane, octahydro-4,7-methano-1H-indenedimethylamine (available under the trade designation TCD DIAMINE from Oxea, Dallas, Tex.), 4,4'-oxybis(aminomethyl)benzene, 2-methylpiperazine, 2,5-dimethylpiperazine, 4,4'-trimethylenedipiperidine, diaminocyclohexane, bis(aminoethyl)benezene, methylenedianiline, phenylenediamine, diaminonaphthalene, toluenediamine, 3,3'-diamino-N-methyldipropylamine, 2,2'-diaminodiethylether, 4,4'-oxybis-(aminomethyl)benzene, 2,5-bis(aminomethyl)thiophene, oxydianiline, polyetheramines such as JEFFAMINE RFD-270 and JEFFAMINE T-403 (available from Huntsman, the Woodlands, Tex.), and combinations thereof.

In certain embodiments, 0 to 30 equivalent percent of the total amine content of the components for the reaction product forming the polymeric material comprises the one or more short chain amines.

A wide variety of long chain (e.g., C17-C48 or higher) amines can be used for embodiments in which the first amine component includes one or more long chain amines. In certain embodiments, the long chain amines can include a highly branched mixture of C36 diamines. Exemplary long chain amines include, but are not limited to, dimer diamines derived from dimer acids, which are dicarboxylic acids prepared by dimerizing unsaturated fatty acids such as those derived from tall oil. Dimer diamines can be prepared from dimer acids, for example, by reaction of the dimer acid with ammonia or an amine, followed by reduction of the resulting amide. Exemplary dimer diamines include, for example, those available under the trade designation PRIAMINE from Croda Inc., Edison, N.J. Other exemplary long chain amines include polyetherpolyamines, such as the JEFFAMINE D, T, and ED series amines from Huntsman, The Woodlands, Tex.

In certain embodiments, 0 equivalent percent or at least 5 equivalent percent of the total primary amine content of the components for the reaction product forming the polymeric material comprises the one or more long chain amines. In certain embodiments, at most 50 equivalent percent or at most 40 equivalent percent of the total primary amine content of the components for the reaction product forming the polymeric material comprises the one or more long chain amines. In certain embodiments, a range of 0 equivalent percent to 50 equivalent percent or a range of 5 equivalent percent to 40 equivalent percent of the total primary amine content of the components for the reaction product forming the polymeric material comprises the one or more long chain amines.

Second Amine Component

The polymeric materials disclosed herein include a second amine component having (i) greater than three primary amino groups, or (ii) at least three primary amino groups and a plurality of secondary amino groups. The second amine component is a polymeric material having a carbon backbone, or a polymeric material having a carbon backbone with a plurality of catenated nitrogen atoms. The polymeric materials disclosed herein can include one compound as the second amine component, or in some embodiments, the polymeric materials disclosed herein can include a mixture of two or more compounds as the second amine component. An important aspect in the selection of the second amine component is to provide multiple amine functionality such that the final polymeric material becomes crosslinked or thermoset upon reaction of all of the components.

A wide variety of compounds can be used as the second amine component. One exemplary compound that is useful as the second amine component is a polyethylene imine.

In certain embodiments, the polyethylene imine can have a weight average molecular weight ($M_w$) of 1,000 to 2,000,000 daltons.

In certain embodiments, the polyethylene imine can have a number average molecular weight ($M_n$) of at least 600 daltons, at least 1,200 daltons, or at least 10,000 daltons. In certain embodiments, the polyethylene imine can have a number average molecular weight ($M_n$) of at most 100,000 daltons or at most 70,000 daltons. In certain embodiments, the polyethylene imine can have a number average molecular weight ($M_n$) in a range of 600 to 100,000 daltons, in a range of 1,200 to 100,000 daltons, or in a range of 10,000 daltons to 70,000 daltons.

In certain embodiments, the use of a solvent or diluent such as water or an alcohol (e.g., ethanol) can be advantageous when higher molecular weight polyethylene imines are used.

In certain embodiments, a portion of the amino groups of the second amine component can optionally be titrated with one or more organic acids to lower the pH by reducing the amount of basic amino groups in the polymeric composition. For example, when the second amine component includes polyethylene imine, 5 to 50 equivalent percent of the amino groups in the polyethylene imine can optionally be titrated with one or more organic acids. Useful organic acids include, for example, carboxylic acids, and in particular, alkanoic acids such as octanoic acid and/or isostearic acid.

In certain embodiments, the second amine component can be a Polymer B that contains nucleophilic groups. In certain embodiments, Polymer B can be prepared with low Tg monomers such as those described, for example, in PCT International Publication No. WO 2011/119363 A1 (Clapper et al.) to impart flow characteristics. Particularly useful monomers include those that form monomeric units of Formula (I), as further discussed herein.

Polymer B includes, among other things, at least 80 weight percent of a plurality of first monomeric units of Formula (I):

wherein each $R^1$ is independently hydrogen or methyl and wherein each $R^2$ and $R^3$ are independently a linear or branched alkyl having 4 to 14 carbon atoms. In certain embodiments, Polymer B comprises at least 80 weight percent, at least 90 percent, or at least 95 weight percent of a plurality of first monomeric units of Formula (I), based on the total weight of Polymer B. In certain embodiments, Polymer B comprises at most 99.9 weight percent, at most 99.5 weight percent, or at most 99 weight percent of a plurality of first monomeric units of Formula (I), based on the total weight of Polymer B. In certain embodiments, Polymer B comprises a range of 80 to 99.9 weight percent, a range of 90 to 99.5 weight percent, or a range of 95 to 99 weight percent of a plurality of first monomeric units of Formula (I), based on the total weight of Polymer B.

The monomeric unit of Formula (I) is a branched alkyl (meth)acrylate. A wide variety of branched alkyl (meth)acrylates can be used for the monomeric unit of Formula (I). Useful branched alkyl (meth)acrylates include (meth)acrylates of 2-alkyl alkanols. Particularly useful branched alkyl (meth)acrylates include, for example, (meth)acrylic acid esters of Guerbet alcohols having 12 to 32 carbon atoms as described in PCT International Publication No. WO 2011/119363 A1 (Clapper et al.).

Polymer B further includes, among other things, a plurality of monomeric units having a primary amino group. Monomeric units having a primary amino group provide nucleophilic groups for Polymer B. In certain embodiments, the plurality of monomeric units of Polymer B having the primary amino group includes at least three monomeric units.

A wide variety of monomeric units having a primary amino group may be incorporated into Polymer B. In some embodiments, Polymer B comprises at least 0.5 weight percent of monomeric units having a primary amino group, based on the total weight of Polymer B. In some embodiments, Polymer B comprises at most 5 weight percent, at most 4 weight percent, at most 3 weight percent, at most 2 weight percent, or at most 1 weight percent of monomeric units having a primary amino group, based on the total weight of Polymer B. In some embodiments, Polymer B comprises a range of 0.5 to 5 weight percent, 0.5 to 4 weight percent, 0.5 to 3 weight percent, 0.5 to 2 weight percent, or 0.5 to 1 weight percent of monomeric units having a primary amino group, based on the total weight of Polymer B.

Particularly useful monomeric units having a primary amino group include, for example, the reaction product of an amine or a polyamine with a maleic anhydride monomeric unit (i.e., a monomeric unit formed from maleic anhydride) or a vinyl dimethyl azlactone monomeric unit (i.e., a monomeric unit formed from vinyl dimethyl azlactone).

A wide variety of amines and/or polyamines can be reacted with the maleic anhydride or the vinyl dimethyl azlactone monomeric unit. In certain embodiments, amines that are liquids at room temperature are selected to be reacted with the maleic anhydride or vinyl dimethyl azlactone monomeric unit. In certain embodiments, amines that are C2 or greater are selected to be reacted with the maleic anhydride or vinyl dimethyl azlactone monomeric unit.

In some embodiments, the amine can include one or more C2-C48 or higher straight chain or cyclic amines (e.g., diamines or triamines) that may optionally include heteroatoms. In certain embodiments, the amine can include one or more short chain (e.g., C2-C16) amines, one or more long chain (e.g., C17-C48 or higher) amines, or a mixture of short chain (e.g., C2-C16) and long chain (e.g., C17-C48 or higher) amines. In certain embodiments, the short chain amines (e.g., diamines or triamines) can act as hard segments to impart crystallinity and hydrogen bonding capabilities to the polymeric composition. In certain embodiments, the long chain amines (e.g., diamines or triamines) can impart increased toughness, increased flexibility, and increased hydrophobic character to the polymeric materials.

Useful amines include, for example, ethylene diamine, propylene diamine, butanediamine, hexanediamine, piperazine, polyether-amines (e.g., polyether diamines such as those available under the trade designation JEFFAMINE RFD-270 available from Huntsman, The Woodlands, Tex.), dimer diamines (e.g., such as those available under the trade designation PRIAMINE from Croda Inc., Edison, N.J.), 3(4),8(9)-bis-(aminomethyl)-tricyclo-[5,2,1,02,6] decane (e.g., available under the trade designation TCD DIAMINE from Oxea, Dallas, Tex.), and combinations thereof. In certain embodiments, a large excess of amine (e.g., 10 equivalents of amine based on the maleic anhydride or vinyl dimethyl azlactone monomeric unit) may be used in the preparation of the monomeric units having the primary amino group.

In some embodiments, monomeric units having a primary amino group can be prepared by polymerizing a monomer having a blocked and/or protected amino group, and removing the blocking or protecting group after the monomer has been polymerized. For example, imines, oximes, carbamates, and tert-butyloxycarbonyl (BOC) groups, or a combination thereof can be used to block and/or protect the nucleophilic amino groups of, for example, a methacrylate monomer having an amino group (e.g., (2-BOC-amino)ethyl methacrylate).

Optionally, Polymer B can further include, among other things, a monomeric unit comprising a plurality of (meth) acryloyl groups. (Meth)acryloyl groups are of formula $H_2C=CR—(CO)—$ where R is hydrogen or alkyl. In many embodiments, the (meth)acryloyl groups are (meth)arcryloyloxy groups of formula $H_2C=CR—(CO)—O—$. Incorporation of a monomeric unit having a plurality of (meth) acryloyl groups into Polymer B can provide a polymer with similar functionality to that of a linear polymer, but with increased branching. In some embodiments increased branching may provide increased cohesive strength. A wide variety of monomeric units having a plurality of (meth) acryloyl groups may be incorporated into Polymer B. In some embodiments, the monomeric unit having a plurality of (meth)acryloyl groups has either 3 or 4 (methy)acryloyl groups. Particularly useful monomers that can be used to form a monomeric unit having a plurality of (meth)acryloyl groups include pentaerythritol tetraacrylate and 1,1,1-trimethylolpropane trimethacrylate. The amount of monomeric units comprising a plurality of (methy)acryloyl groups incorporated into Polymer B can be controlled as desired to provide a balance between cohesive strength and flow properties. In some embodiments, Polymer B comprises at most 2 weight percent of monomeric units comprising a plurality of (meth)acryloyl groups, based on the total weight of Polymer B. In certain embodiments, Polymer B can have substantially no branching (e.g., 0 percent branching). In certain embodiments, Polymer B can have at most 2 percent branching, at most 1 percent branching, or at most 0.5 percent branching.

Varying the molecular weight of Polymer B can influence the properties of the resulting polymeric materials. For certain exemplary formulations, to provide flow at 100% solids, a Polymer B with a low molecular weight may be selected. Intrinsic viscosity (IV) is commonly used as a measure of molecular weight for Polymer B. Although a material useful as Polymer B can have a widely varying polydispersity index (PDI), in certain embodiments, the polydispersity index (PDI) can be near 1 such as in a range of 1 to 3, in a range of 1 to 2.5, in a range of 1 to 2, in a range of 1 to 1.5, or in a range of 1 to 1.2.

In certain embodiments, Polymer B has a weight average molecular weight ($M_w$) of at least 12,000 daltons or at least 18,000 daltons. In certain embodiments, Polymer B has a weight average molecular weight ($M_w$) of at most 100,000 daltons or at most 65,000 daltons. In certain embodiments, Polymer B has a weight average molecular weight ($M_w$) in a range of 12,000 daltons to 100,000 daltons or in a range of 18,000 daltons to 65,000 daltons. The molecular weight of Polymer B may be controlled by the temperature of the polymerization reaction, concentration of the free radical initiator, addition of a chain transfer agent, and/or concentration of a solvent, as further discussed herein.

In certain embodiments, Polymer B can flow at room temperature and/or body temperature (e.g., 37° C.). Polymer B can be considered to flow at room temperature and/or body temperature if it has no fixed shape. In some embodiments, Polymer B can be a viscoelastic fluid at room temperature and/or body temperature.

In some embodiments, Polymer B can have hydrophobic or hydrophilic properties. In certain embodiments, for example, when the polymeric composition is used as a topical skin adhesive, it can be advantageous for Polymer B to have hydrophobic properties to help limit the uptake of aqueous bodily fluids, such as blood, by the polymeric material.

Polymer B can be prepared by free radical polymerization of monomers, such as (meth)acrylate monomers, to form the polymers having the recited monomeric units. In addition to the monomers used to form the various monomeric units described above, the polymerizable composition used to prepare Polymer B typically includes a free radical initiator to commence polymerization of the monomers. The free radical initiator can be a photoinitator or a thermal initiator. The amount of the free radical initiator is often in a range of 0.05 to 5 weight percent based on a total weight of monomers used.

Suitable thermal initiators include various azo compound such as those commercially available under the trade designation VAZO from E. I. DuPont de Nemours Co. (Wilmington, Del., USA) including VAZO 67, which is 2,2'-azobis (2-methylbutane nitrile), VAZO 64, which is 2,2'-azobis (isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemicals, Inc. (Philadelphia, Pa.) under the trade designation LUPEROX (e.g., LUPEROX 101, which is 2,5-bis(tert-butylperoxy)-2,5-dimethylhexane, and LUPEROX 130, which is 2,5-dimethyl-2,5-di-(tert-butylperoxy)-3-hexyne); various hydroperoxides such as tert-amyl hydroperoxide and tert-butyl hydroperoxide; and mixtures thereof.

In some embodiments, a photoinitiator may be used. Some exemplary photoinitiators are benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenylphosphineoxide (commercially available under the trade designation IRGACURE 819), 2,4,6-trimethylbenzoylphenylphosphinic acid ethyl ester (commercially available under the trade designation IRGACURE TPO-L), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl) butanone (commercially available under the trade designation IRGACURE 369), 2-methyl-1-[4-(methylthio)phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA).

The polymerizable composition may optionally further contain a chain transfer agent to control the molecular weight of the resultant (meth)acrylate copolymer. Examples of useful chain transfer agents include, but are not limited to, carbon tetrabromide, alcohols (e.g., ethanol and isopropanol), mercaptans or thiols (e.g., lauryl mercaptan, butyl mercaptan, tert-dodecyl mercaptan, ethanethiol, isooctylthioglycolate, 2-ethylhexyl thioglycolate, 2-ethylhexyl mercaptopropionate, ethyleneglycol bisthioglycolate), and mixtures thereof. If used, the polymerizable mixture may include up to 1 weight percent of a chain transfer agent based on a total weight of monomers. The amount can be up to 0.5 weight percent, up to 0.3 weight percent, up to 0.2 weight percent, or up to 0.1 weight percent and is often equal to at least 0.005 weight percent, at least 0.01 weight percent, at least 0.05 weight percent, or at least 0.1 weight percent. For example, the polymerizable composition can contain 0.005 to 0.5 weight percent, 0.01 to 0.5 weight percent, 0.05 to 0.2 weight percent, 0.01 to 0.2 weight percent, or 0.01 to 0.1 weight percent chain transfer agent based on the total weight of monomers.

The polymerizable composition can further include other components such as, for example, antioxidants and/or stabilizers such as hydroquinone monomethyl ether (p-methoxyphenol, MeHQ), and those available under the trade designation IRGANOX 1010 (tetrakis(methylene(3,5-di-tert-butyl-4-hydroxyhydrocinnamate))methane) from BASF Corp. (Florham Park, N.J., USA). The antioxidant and/or stabilizer can be used to increase the temperature stability of the resulting (meth)acrylate copolymer. If used, an antioxidant and/or stabilizer is typically used in a range of 0.01 percent by weight (weight percent) to 1.0 weight percent, based on the total weight of monomers in the polymerizable composition.

The polymerization of the polymerizable composition can occur in the presence or absence of an organic solvent. If an organic solvent is included in the polymerizable composition, the amount is often selected to provide the desired viscosity to the polymerizable composition and to the polymerized composition. Examples of suitable organic solvents include, but are not limited to, methanol, tetrahydrofuran, ethanol, n-propanol, isopropanol, heptane, acetone, methyl ethyl ketone, methyl acetate, ethyl acetate, toluene, xylene, and ethylene glycol alkyl ether. Those solvents can be used alone or combined as mixtures. In some embodiments, the organic solvent is present in an amount 70 weight percent or less, based on the total weight of the polymerizable composition and organic solvent. In some embodiments, the organic solvent is present in an amount 60 weight percent or more, based on the total weight of the polymerizable composition and the organic solvent. If used, any organic solvent typically is removed at the completion of the polymerization reaction or during coating. In some embodiments, the polymerization occurs with little or no organic solvent present. That is the polymerizable composition is free of organic solvent or contains a minimum amount of organic solvent.

Polymer B can be prepared by any conventional polymerization method (such as solution polymerization or emulsion polymerization) including thermal bulk polymerization under adiabatic conditions, as is disclosed in U.S. Pat. No. 5,637,646 (Ellis) and U.S. Pat. No. 5,986,011 (Ellis et al.). Other methods of preparing Polymer B include the continuous free radical polymerization methods described in U.S. Pat. Nos. 4,619,979 and 4,843,134 (Kotnour et al.) and the polymerization within a polymeric package as described in U.S. Pat. No. 5,804,610 (Hamer et al.).

In certain embodiments, at least 10 equivalent percent or at least 20 equivalent percent of the total primary amine content of the components for the reaction product forming the polymeric material comprises the second amine component. In certain embodiments, at most 80 equivalent percent or at most 50 equivalent percent of the total primary amine content of the components for the reaction product forming the polymeric material comprises the second amine component. In certain embodiments, a range of 10 to 80 equivalent percent or a range of 20 to 50 equivalent percent of the total primary amine content of the components for the reaction product forming the polymeric material comprises the second amine component.

Oxalate Esters

The polymeric compositions disclosed herein include, among other things, an oxalic acid ester (e.g., an oxalate ester) and/or a reaction product of an oxalate ester. An exemplary oxalate ester is a compound of Formula (IV):

$$R^4O-(CO)-(CO)-OR^4 \qquad (IV)$$

wherein each $R^4$ is independently alkyl, substituted alkyl, aralkyl, substituted aralkyl, alkenyl, aryl, or substituted aryl.

In some embodiments, each $R^4$ is independently an aralkyl substituted with halo, alkyl, haloalkyl, alkoxy, or alkoxycarbonyl. In some embodiments, each $R^4$ is independently an aryl substituted with halo, alkyl, haloalkyl, alkoxy, or alkoxycarbonyl. In certain embodiments, each $R^4$ is methyl, ethyl, n-propyl, i-propyl, n-butyl, t-butyl, or phenyl.

In some embodiments, the use of oxalate esters (e.g., diethyl oxalate) can be particularly advantageous for use in the polymeric compositions disclosed herein. For example, although diethyl oxalate is a reactive component, it can also function as a diluent to improve the flow properties of the component materials.

Two-Part Reactive Compositions

In some embodiments, the polymeric materials are prepared as two-part formulations. The first part can include a compound of Formula (IV) as described herein, and an oxalamido-containing compound that has at least two groups of the formula —$NR^5$—(CO)—(CO)—$OR^4$; wherein each $R^4$ is independently alkyl, substituted alkyl, aralkyl, substituted aralkyl, alkenyl, aryl, or substituted aryl; wherein each $R^5$ is independently H, alkyl, substituted alkyl, alkylene, aralkyl, substituted aralkyl, alkenyl, aryl, or substituted aryl; and wherein the oxalamido-containing compound is free of a siloxane segment. The second part can include a second amine component as described herein.

The oxalamido-containing compound that has at least two groups of the formula —$NR^5$—(CO)—(CO)—$OR^4$, wherein each $R^4$ is independently alkyl, substituted alkyl, aralkyl, substituted aralkyl, alkenyl, aryl, or substituted aryl; and wherein each $R^5$ is independently H, alkyl, substituted alkyl, alkylene, aralkyl, substituted aralkyl, alkenyl, aryl, or substituted aryl, can conveniently be prepared, for example, by reacting a compound of Formula (IV) as described herein with an amine-containing compound. In certain embodiments, the oxalamido-containing compound that has at least two groups of the formula —$NR^5$—(CO)—(CO)—$OR^4$ is prepared by reacting a compound of Formula (IV) as described herein with the first amine component having at least two and at most three primary amino groups, secondary amino groups, or a mixture thereof, as described herein, or a portion thereof. In some embodiments, a compound of Formula (IV), as described herein, is reacted with a long chain amine such as a dimer diamine. In certain embodiments, compared to equivalents of the amine, an excess based on equivalents of a compound of Formula (IV), as described herein, is reacted with a diamine to prepare a diamine end capped with the oxalate ester. In certain embodiments, compared to equivalents of the diamine, a 10 fold or higher excess, an 8 fold excess, a 6 fold excess, a 5 fold excess, a 4 fold excess, a 3 fold excess, a 2 fold excess, a 1 fold excess, or a 0.5 fold excess of a compound of Formula (IV), as described herein, is reacted with the diamine.

In some embodiments, the first part, the second part, or both the first and second parts of the two-part reactive composition can optionally include additional amine components such as triamine components (e.g., tris(2-aminoethyl)amine (TRIS) and/or diethylenetriamine), tetraamine components (e.g., triethylenetetraamine), or other polyamine components. In certain embodiments, the additional amine component can be added to the second part of the two-part reactive composition. The addition of triamine components, tetraamine components, and/or polyamine components can lead to an increased level of crosslinking in the polymeric material.

In some embodiments, the first part, the second part, or both the first and second parts of the two-part reactive composition can optionally include one or more components such as a surfactant (e.g., a non-ionic surfactant) and/or a compatibilizing agent (e.g., a polyethylene glycol). A wide variety of surfactants and/or compatibilizing agents can be used.

Exemplary surfactants and/or compatibilizing agents include, but are not limited to, polyethyleneglycol 200, polyethyleneglycol 400, a dimer diol available under the trade designation PRIPOL 2033 (Croda Inc., Edison, N.J.), glyceryl monoisostearate, tributyl citrate, polyethylene glycol dicaprylate/caprate (available under the trade designation ESTOL 1526 from Croda Inc., Edison, N.J.), octyldodecanol (available under the trade designation EUTANOL G from BASF, Florham Park, N.J.), a non-ionic surfactant available under the trade designation SPAN 80 (TCI America, Portland, Oreg.), a surfactant available under the trade designation BRIJ-L4-LQ-AP (Croda Inc., Edison, N.J.), methoxypolyethylene glycol (available under the trade designation CARBOWAX 750 from Dow, Midland, Mich.), triethyl citrate, dibutyl sebacate, isopropyl isostearate, glycerol tricaprylate/caprate, a biomimetic skin lipid available under the trade designation PRIPURE 3759 (Croda Inc., Edison, N.J.), a conditioning agent for hair care available under the trade designation ABILQUAT 3272 (Goldschmidt Chemical Corp., Hopewell, Va.), lauryl pyrrolidone, glycereth-7 trimethyl ether (available under the trade designation COSCAP G-7MC from Phoenix Chemical, Inc., Somerville, N.J.), sodium tetrapropylenebenzenesulphonate (available under the trade designation RHODACAL DS-10 (Solvay, Houston, Tex.), alkyl polyglucosides available under the trade designations GLUCOPON and PLANTACARE (BASF, Florham Park, N.J.), a semicrystalline polyester polyol available under the trade designation PRIPLAST 3190 (Croda Inc., Edison, N.J.), sorbitan isostearate (available under the trade designation SPAN 120 LQ (Croda Inc., Edison, N.J.), an amorphous polyester polyol available under the trade designation PRIPLAST 3190 (Croda Inc., Edison, N.J.), cholesterol, and a polyoxyethylene sorbitan fatty acid ester available under the trade designation NIKKOL TL-40 (Nikko Chemicals, Tokyo, Japan).

In certain embodiments, the surfactants and/or compatibilizing agents are miscible or nearly miscible (e.g., as listed in Table 21 of the working examples) with other components of the polymeric material. The surfactant and/or compatibilizing agent can be used, for example, to improve the compatibility or miscibility of the components, and/or to adjust the viscosity and/or the volume of one or both parts of the two-part reactive composition.

In certain embodiments, a polyethylene glycol having a weight average molecular weight ($M_w$) of 200 to 2,000 daltons is used as a compatibilizing agent.

The reaction of the first part and the second part of the two-part reactive composition can lead to a crosslinked polyoxalamide having oxalamido linkages of the formula —$NR^5$—(CO)—(CO)—$NR^5$— in the crosslinked chains, wherein each $R^5$ is independently H, alkyl, substituted alkyl, alkylene, aralkyl, substituted aralkyl, alkenyl, aryl, or substituted aryl. In some embodiments, each $R^5$ is independently, H, alkyl, or alkylene. In some embodiments, each $R^5$ is independently an aralkyl substituted with halo, alkyl, haloalkyl, alkoxy, or alkoxycarbonyl. In some embodiments, each $R^5$ is independently an aryl substituted with halo, alkyl, haloalkyl, alkoxy, or alkoxycarbonyl.

Adhesive Compositions

Adhesive compositions that include the polymeric materials disclosed herein can be useful for adhesion to a wide variety of substrates including, for example, wood, fiberglass, plastics (e.g., polyvinylidene chloride, (PVC)), and/or metal (e.g., stainless steel) substrates. In certain embodiments, the adhesive composition can be used for adhesion to skin (e.g., a topical skin adhesive).

The compositions of the polymeric materials disclosed herein can be varied as desired to achieve useful properties for the particular application. As such, useful flow properties, workability, and tack will depend on the particular application for the adhesive composition. For example, low flow properties and a long workability time (e.g., minutes or hours) can be useful for adhesion to wood, fiberglass, plastic, and/or metal substrates, especially when they can be clamped together during cure. For another example, good flow properties (e.g., to wet a substrate) and relatively short workability (e.g., for 10 to 90 seconds at room temperature) can be useful for adhesion to skin.

In addition, the compositions of the polymeric materials disclosed herein can be varied as desired to achieve useful properties after reaction of the polymeric composition such as, for example, cohesive strength, tensile strength, flexibility, and tack.

For example, the curing and cured properties of the polymeric materials will depend on, among other thing, the amount and ratio of the nucleophilic amine components to the electrophilic oxalate groups.

For another example, the curing and cured properties of the polymeric materials will depend on, among other thing, the amount and ratios of the first amine component to the second amine component.

Further, additional nucleophilic amino groups can be added to the polymeric materials, for example, by adding optional amine components (e.g., different than the first amine component and the second amine component) to the polymeric composition, typically to the second part of a two-part reactive composition.

In certain embodiments, the molar ratio of the nucleophilic primary amino groups to the electrophilic oxalate groups in the polymeric composition is selected to be approximately 1:1.

In certain embodiments, the molar ratio of the nucleophilic primary amino groups to the electrophilic oxalate groups in the polymeric composition is selected to be less than 1:1, such that electrophilic oxalate groups remain after reaction of the components to form the polymeric composition, which can allow for the remaining electrophilic oxalate groups to react, for example, with nucleophilic groups present on human skin.

In other certain embodiments, the molar ratio of the nucleophilic primary amino groups to the electrophilic oxalate groups in the polymeric composition is selected to be greater than 1:1, such that nucleophilic amino groups remain after reaction of the components to form the polymeric composition, which can allow for the remaining nucleophilic groups to react, for example, with electrophilic groups present on the substrate used for adhesion.

In certain embodiments, the ratio of primary amines to secondary amines in the nucleophilic amino groups can be controlled to modify, for example, the rate of reaction at a selected temperature. In some embodiments, a higher ratio of primary amines to secondary amines can result in a faster cure rate.

In certain embodiments, aliphatic amines or aromatic amines can be selected for the nucleophilic amino groups to modify, for example, the rate of reaction at a selected temperature. In some embodiments, the selection of aliphatic amines can result in a fast cure rate at lower temperatures (e.g., room temperature). In some embodiments, the selection of aromatic amines can result in a slow cure rate at lower temperatures (e.g., room temperature), but useful cure rates at higher temperatures (e.g., 65° C. to 100° C. or higher).

In certain embodiments, a combination of aliphatic amines and aromatic amines can be selected for the nucleophilic amino groups to modify, for example, the rate of reaction at various selected temperatures. In some embodiments using a combination of aliphatic amines and aromatic amines, the aliphatic amines can result in a fast cure rate at lower temperatures (e.g., room temperature), and the aromatic amines can result in additional cure at higher temperatures (e.g., 65° C. to 100° C.). In some embodiments, the ratio of aliphatic amines to aromatic amines can be selected to modify the rate and degree of cure at various temperatures. In some embodiments, some degree of cure at lower temperature can be useful to solidify the adhesive, and additional cure at higher temperatures can be useful for developing improved adhesion and/or strength properties.

In certain embodiments, blocked and/or protected amines can be selected for the nucleophilic amino groups to modify, for example, the rate of reaction at a selected temperature and/or to prevent premature reaction prior to application to the substrate. In some embodiments, the selection of blocked and/or protected amines can result in a slow cure rate at lower temperatures (e.g., room temperature), but useful cure rates at higher temperature (e.g., 65° C. to 100° C.). A wide variety of blocked and/or protected amines can be used for the nucleophilic amino groups. In some embodiments, moisture sensitive blocking groups can prevent reaction prior to application, but the presence of moisture on the substrate can allow unblocking of the amines and rapid curing. For example, imines, oximes, carbamates, and tert-butyloxycarbonyl (BOC) groups, or a combination thereof can be used to block and/or protect the nucleophilic amino groups.

In certain embodiments, a combination of unblocked amines and blocked and/or protected amines can be selected for the nucleophilic amino groups to modify, for example, the rate of reaction at various selected temperatures. In some embodiments, using a combination of unblocked amines and blocked and/or protected amines, the unblocked amines can result in a fast cure rate at lower temperatures (e.g., room temperature), and the blocked and/or protected amines can result in additional cure at higher temperatures (e.g., 65° C. to 100° C.). In some embodiments, the ratio of unblocked amines to blocked and/or protected amines can be selected to modify the rate and degree of cure at various temperatures. In some embodiments, some degree of cure at lower temperature can be useful to solidify the adhesive, and additional cure at higher temperatures can be useful for developing improved adhesion properties.

The particular amounts and molecular weights of the various components of the polymeric materials disclosed herein will depend on the desired balance of properties in the reactive and reacted compositions, and can be readily selected by one of skill in the art in view of the working examples disclosed herein.

In certain embodiments, the polymeric materials disclosed herein can be used, for example, as skin or tissue adhesives. Sutures and topical skin adhesives have both been used, either alone or in combination, for wound closure. Topical skin adhesives have been used primarily as tissue sealants in conjunction with sutures, and/or for closure of small wounds. In certain embodiments, the polymeric materials disclosed herein advantageously have properties useful for topical skin adhesives including, for example, one or more of biocompatibility, short cure time, high tensile strength, and flexibility.

Additional materials can be added to the adhesive composition as desired to achieve desirable properties such as mechanical stability, skin adhesion, healing rate, and oxygen permeability. Exemplary additional materials are known in the art and include, but are not limited to, a non-ionic surfactant, a polyethylene glycol, a filler, a dye, an antioxidant, a tackifier, a solvent, a diluent, a viscosity modifier, an antimicrobial agent (e.g., an antibacterial agent), and combinations thereof.

The polymeric materials disclosed herein can be reacted, for example, by providing a two-part reactive composition as described herein; and combining the first part and the second part under conditions effective for the reaction of the first part and the second part to form the polymeric material. In some embodiments the first part and the second part are combined at room temperature. In some embodiments, the first part and the second part are combined in a temperature range of room temperature to 100° C., room temperature to 65° C., or room temperature to 60° C. In some embodiments, the first part and the second part are combined under ambient conditions (e.g., in air without employing a nitrogen purge). In some embodiments, the first part and the second part are combined at body temperature (e.g., 37° C.).

In some embodiments, the first part and the second part of a two-part reactive composition are combined using mixing and/or dispensing methods and/or devices known in the art, such as manual mixing, a mechanical mixing device, an automatic mixing device, a static mixing device, an extrusion mixing device, or a combination thereof. For example, the first part of a two-part reactive composition can be present in a first chamber of a multi-chambered mixing and/or dispensing device (e.g., a first barrel of a dual barreled syringe), and the second part can be present in a second chamber of a multi-chambered mixing and/or dispensing device (e.g., a second barrel of a dual barreled syringe).

Thus, in another aspect, the present disclosure provides a multi-chambered mixing and/or dispensing device containing the two-part reactive composition described herein, wherein the first part is present in a first chamber of the multi-chambered mixing and/or dispensing device, and the second part is present in a second chamber of the multi-chambered mixing and/or dispensing device. In certain embodiments, the multi-chambered mixing and/or dispensing device is a dual barreled syringe containing the two-part reactive composition described herein, wherein the first part is present in a first barrel of the dual barreled syringe, and the second part is present in a second barrel of the dual barreled syringe. Optionally, the dual barreled syringe may include or be connected to a static mixing device to mix the contents of each barrel upon delivery from the syringe.

Illustrative Embodiments of the Present Disclosure

Various embodiments are disclosed that can provide crosslinked, thermoset polymeric materials, and methods of making and using the polymeric materials.

Embodiment 1A is a polymeric material comprising a reaction product of components comprising: a) a first amine component having at least two and at most three primary amino groups, secondary amino groups, or a mixture thereof, with the proviso that the first amine component is not a silicone diamine; b) a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms; and c) a compound of Formula (IV):

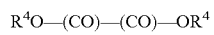

$R^4O-(CO)-(CO)-OR^4$ (IV), wherein each $R^4$ is independently alkyl, substituted alkyl, aralkyl, substituted aralkyl, alkenyl, aryl, or substituted aryl; wherein the polymeric material is a crosslinked polyoxalamide having oxalamido linkages of the formula $-NR^5-(CO)-(CO)-NR^5-$ in the crosslinked chains, wherein each $R^5$ is independently H, alkyl, substituted alkyl, alkylene, aralkyl, substituted aralkyl, alkenyl, aryl, or substituted aryl, and wherein an equivalent weight ratio of the total of the primary and/or secondary amines of the first amine component and the primary amines of the second amine component to the oxalate ester is in a range of 0.8 to 1.2.

Embodiment 2A is the polymeric material of embodiment 1A, wherein each $R^5$ is independently, H, alkyl, or alkylene.

Embodiment 3A is the polymeric material of embodiment 1A or 2A, wherein each $R^4$ is methyl, ethyl, n-propyl, i-propyl, n-butyl, t-butyl, or phenyl.

Embodiment 4A is the polymeric material of any one of embodiments 1A to 3A, wherein the first amine component comprises one or more C2-C48 or higher amines.

Embodiment 5A is the polymeric material of any one of embodiments 1A to 4A, wherein the first amine component comprises one or more C2-C16 amines.

Embodiment 6A is the polymeric material of embodiment 5A, wherein 30 or less equivalent percent of the total amine content of the components for the reaction product forming the polymeric material comprises the one or more C2-C16 amines.

Embodiment 7A is the polymeric material of embodiment 5A or 6A, wherein the one or more C2-C16 amines are diamines or triamines.

Embodiment 8A is the polymeric material of any one of embodiments 5A to 7A, wherein the one or more C2-C16 amines are selected from the group consisting of ethylene diamine, 1,2-propanediamine, 1,3-propanediamine, 1,4-butanediamine, 1,6-hexanediamine, 1,8-octanediamine, 1,12-dodecanediamine, methylenebiscyclohexylamine, m- and p-xylylenediamine, bis(aminomethyl)cyclohexane, piperazine, isophoronediamine, N-(2-aminoethyl)piperazine, N,N'-bis(3-aminopropyl)piperazine, tris(2-aminoethyl)amine, 3,3'-diaminodipropylether, 1,13-diamino-4,7,10-trioxatridecane, octahydro-4,7-methano-1H-indenedimethylamine, 4,4'-oxybis(aminomethyl)benzene, 2-methylpiperazine, 2,5-dimethylpiperazine, 4,4'-trimethylenedipiperazine, diaminocyclohexane, bis(aminoethyl)benzene, methylenedianiline, phenylenediamine, diaminonaphthalene, toluenediamine, 3,3'-diamino-N-methyldipropylamine, 2,2'-diaminodiethylether, 4,4'-oxybis-(aminomethyl)benzene, 2,5-bis(aminomethyl)thiophene, oxydianiline, polyetheramines, and combinations thereof.

Embodiment 9A is the polymeric material of any one of embodiments 1A to 8A, wherein the first amine component comprises one or more C17-C48 or higher amines.

Embodiment 10A is the polymeric material of embodiment 9A, wherein the one or more C17-C48 or higher amines are diamines or triamines.

Embodiment 11A is the polymeric material of embodiment 9A or 10A, wherein 0 to 50 equivalent percent of the total amine content of the components for the reaction product forming the polymeric material comprises the one or more C17-C48 or higher amines.

Embodiment 12A is the polymeric material of any one of embodiments 9A to 11A, wherein a range of 5 to 40 equivalent percent of the total amine content of the components for the reaction product forming the polymeric material comprises the one or more C17-C48 or higher amines.

Embodiment 13A is the polymeric material of any one of embodiments 9A or 12A, wherein the one or more C17-C48 or higher amines comprise a highly branched mixture of C36 diamines.

Embodiment 14A is the polymeric material of any one of embodiments 1A to 13A, wherein the first amine component comprises one or more C2-C16 amines and one or more C17-C48 or higher amines.

Embodiment 15A is the polymeric material of any one of embodiments 1A to 14A, wherein the second amine component comprises a polyethylene imine.

Embodiment 16A is the polymeric material of embodiment 15A, wherein the polyethylene imine has a number average molecular weight ($M_n$) in a range of 600 to 100,000 daltons.

Embodiment 17A is the polymeric material of embodiment 15A or 16A, wherein the polyethylene imine has a number average molecular weight ($M_n$) in a range of 1,200 to 100,000 daltons.

Embodiment 18A is the polymeric material of any one of embodiments 15A to 17A, wherein the polyethylene imine has a number average molecular weight ($M_n$) in a range of 10,000 to 70,000 daltons.

Embodiment 19A is the polymeric material of any one of embodiments 15A or 18A, wherein a range of 5 to 50 equivalent percent of the amino groups in the polyethylene imine have been titrated with one or more organic acids.

Embodiment 20A is the polymeric material of embodiment 19A, wherein the one or more organic acids comprise a carboxylic acid.

Embodiment 21A is the polymeric material of embodiment 20A, wherein the carboxylic acid is an alkanoic acid.

Embodiment 22A is the polymeric material of embodiment 21A, wherein alkanoic acid comprises octanoic acid and/or isostearic acid.

Embodiment 23A is the polymeric material of any one of embodiments 1A to 22A, wherein the second amine component comprises a Polymer B comprising: a range of 80 to 99.9 weight percent of a plurality of first monomeric units of Formula (I):

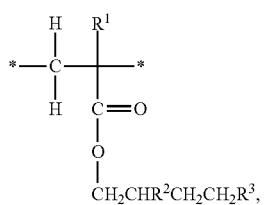

wherein: each $R^1$ is independently hydrogen or methyl; each $R^2$ and $R^3$ are independently a linear or branched alkyl having 4 to 14 carbon atoms; and at least three monomeric units having a primary amino group.

Embodiment 24A is the polymeric material of embodiment 23A, wherein Polymer B comprises a range of 90 to 99.5 weight percent of a plurality of first monomeric units of Formula (I).

Embodiment 25A is the polymeric material of embodiment 23A or 24A, wherein Polymer B comprises a range of 95 to 99 weight percent of a plurality of first monomeric units of Formula (I).

Embodiment 26A is the polymeric material of any one of embodiments 23A to 25A, wherein Polymer B has a weight average molecular weight ($M_w$) in a range of 12,000 daltons to 100,000 daltons.

Embodiment 27A is the polymeric material of any one of embodiments 23A to 26A, wherein Polymer B has a weight average molecular weight ($M_w$) in a range of 18,000 daltons to 65,000 daltons.

Embodiment 28A is the polymeric material of any one of embodiments 23A to 27A, wherein a monomeric unit of the plurality of monomeric units of Polymer B having a primary amino group is a reaction product of an amine or a polyamine with a monomeric unit formed from maleic anhydride or a monomeric unit formed from vinyl dimethyl azlactone.

Embodiment 29A is the polymeric material of embodiment 28A, wherein the amine is a diamine or a triamine.

Embodiment 30A is the polymeric material of embodiment 28A or 29A, wherein the amine is ethylene diamine, propylene diamine, butanediamine, hexanediamine, piperazine, a polyether-amine, a dimer diamine, 3(4),8(9)-bis-(aminomethyl)-tricyclo-[5,2,1,02,6] decane, or a combination thereof.

Embodiment 31A is the polymeric material of any one of embodiments 28A to 30A, wherein the polyamine is a polyether-amine.

Embodiment 32A is the polymeric material of any one of embodiments 23A to 31A, wherein Polymer B flows at room temperature.

Embodiment 33A is the polymeric material of any one of embodiments 23A to 32A, wherein Polymer B is hydrophobic.

Embodiment 34A is the polymeric material of any one of embodiments 1A to 33A, wherein a range of 10 equivalent percent to 80 equivalent percent of the total primary amine content of the components for the reaction product forming the polymeric material comprises the second amine component.

Embodiment 35A is the polymeric material of any one of embodiments 1A to 34A, wherein a range of 20 equivalent percent to 50 equivalent percent of the total primary amine content of the components for the reaction product forming the polymeric material comprises the second amine component.

Embodiment 36A is the polymeric material of any one of embodiments 1A to 35A, further comprising a component selected from the group consisting of a non-ionic surfactant, a polyethylene glycol, a filler, a dye, an antioxidant, a tackifier, a solvent, a diluent, a viscosity modifier, an antimicrobial agent (e.g., an antibacterial agent), and combinations thereof.

Embodiment 37A is the polymeric material of embodiment 36A, wherein the polyethylene glycol has a weight average molecular weight ($M_w$) in a range of 200 to 2,000 daltons.

Embodiment 38A is the polymeric material of any one of embodiments 1A to 37A wherein the first amine component, the second amine component, or both comprise a blocked and/or protected amino group.

Embodiment 1B is an adhesive composition comprising the polymeric material of any one of embodiments 1A to 38A.

Embodiment 1C is a two-part reactive composition comprising: a) a first part comprising an oxalamido-containing compound and a compound of Formula (IV); wherein the oxalamido-containing compound has at least two groups of the formula —$NR^5$—(CO)—(CO)—$OR^4$, wherein each $R^4$ is independently alkyl, substituted alkyl, aralkyl, substituted aralkyl, alkenyl, aryl, or substituted aryl; wherein each $R^5$ is independently H, alkyl, substituted alkyl, alkylene, aralkyl, substituted aralkyl, alkenyl, aryl, or substituted aryl; wherein the groups of the formula —NR⁵—(CO)—(CO)—OR⁴ are the reaction products of a first amine component with a compound of Formula (IV); wherein the first amine component has at least two and at most three primary amino groups, secondary amino groups, or a mixture thereof; wherein the oxalamido-containing compound is free of a siloxane segment; and wherein the compound of Formula (IV) is of the formula:

R⁴O—(CO)—(CO)—OR⁴          (IV), wherein each R⁴ is independently alkyl, substituted alkyl, aralkyl, substituted aralkyl, alkenyl, aryl, or substituted aryl; and b) a second part comprising a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms.

Embodiment 2C is the two-part reactive composition of embodiment 1C, wherein each R⁵ is independently, H, alkyl, or alkylene.

Embodiment 3C is the two-part reactive composition of embodiment 1C or 2C, wherein each R⁴ is methyl, ethyl, n-propyl, i-propyl, n-butyl, t-butyl, or phenyl.

Embodiment 4C is the two-part reactive composition of any one of embodiments 1C to 3C, wherein the second amine component comprises a polyethylene imine.

Embodiment 5C is the two-part reactive composition of embodiment 4C, wherein the polyethylene imine has a number average molecular weight ($M_n$) in a range of 600 to 100,000 daltons.

Embodiment 6C is the two-part reactive composition of embodiment 4C or 5C, wherein the polyethylene imine has a number average molecular weight ($M_n$) in a range of 1,200 to 100,000 daltons.

Embodiment 7C is the two-part reactive composition of any one of embodiments 4C to 6C, wherein the polyethylene imine has a number average molecular weight ($M_n$) in a range of 10,000 to 70,000 daltons.

Embodiment 8C is the two-part reactive composition of any one of embodiments 4C to 7C, wherein 5 to 50 equivalent percent of the amino groups in the polyethylene imine have been titrated with one or more organic acids.

Embodiment 9C is the two-part reactive composition of embodiment 8C, wherein the one or more organic acids comprise a carboxylic acid.

Embodiment 10C is the two-part reactive composition of embodiment 9C wherein the carboxylic acid is an alkanoic acid.

Embodiment 11C is the two-part reactive composition of embodiment 10C, wherein alkanoic acid comprises octanoic acid and/or isostearic acid.

Embodiment 12C is the two-part reactive composition of any one of embodiments 1C to 11C, wherein the second amine component comprises a Polymer B comprising: a range of 80 to 99.9 weight percent of a plurality of first monomeric units of Formula (I):

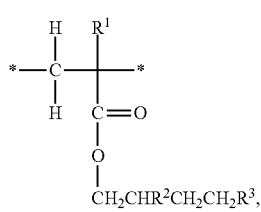

wherein each $R^1$ is independently hydrogen or methyl; each $R^2$ and $R^3$ are independently a linear or branched alkyl having 4 to 14 carbon atoms; and at least three monomeric units having a primary amino group.

Embodiment 13C is the two-part reactive composition of embodiment 12C, wherein Polymer B comprises a range of 90 to 99.5 weight percent of a plurality of first monomeric units of Formula (I).

Embodiment 14C is the two-part reactive composition of embodiment 12C or 13C, wherein Polymer B comprises a range of 95 to 99 weight percent of a plurality of first monomeric units of Formula (I).

Embodiment 15C is the two-part reactive composition of any one of embodiments 12C to 14C, wherein Polymer B has a weight average molecular weight ($M_w$) in a range of 12,000 daltons to 100,000 daltons.

Embodiment 16C is the two-part reactive composition of any one of embodiments 12C to 15C, wherein Polymer B has a weight average molecular weight ($M_w$) in a range of 18,000 daltons to 65,000 daltons.

Embodiment 17C is the two-part reactive composition of any one of embodiments 12C to 16C, wherein a monomeric unit of the plurality of monomeric units of Polymer B having a primary amino group is a reaction product of an amine or a polyamine with a monomeric unit formed from maleic anhydride or a monomeric unit formed from vinyl dimethyl azlactone.

Embodiment 18C is the two-part reactive composition of embodiment 17C, wherein the amine is a diamine or a triamine.

Embodiment 19C is the two-part reactive composition of embodiment 17C or 18C, wherein the amine is ethylene diamine, propylene diamine, butanediamine, hexanediamine, piperazine, a polyether-amine, a dimer diamine, 3(4),8(9)-bis-(aminomethyl)-tricyclo-[5,2,1,02,6] decane, or a combination thereof.

Embodiment 20C is the two-part reactive composition of embodiment 17C, wherein the polyamine is a polyether-amine.

Embodiment 21C is the two-part reactive composition of any one of embodiments 12C to 20C, wherein Polymer B flows at room temperature.

Embodiment 22C is the two-part reactive composition of any one of embodiments 12C to 21C, wherein Polymer B is hydrophobic.

Embodiment 23C is the two-part reactive composition of any one of embodiments 1C to 22C, wherein a range of 10 equivalent percent to 80 equivalent percent of the total primary amine content of the components for the reaction product forming the polymeric material comprises the second amine component.

Embodiment 24C is the two-part reactive composition of any one of embodiments 1C to 23C, wherein a range of 20 equivalent percent to 50 equivalent percent of the total primary amine content of the components for the reaction product forming the polymeric material comprises the second amine component.

Embodiment 25C is the two-part reactive composition of any one of embodiments 1C to 24C, further comprising a component selected from the group consisting of a non-ionic surfactant, a polyethylene glycol, a filler, a dye, an antioxidant, a tackifier, a solvent, a diluent, a viscosity modifier, an antimicrobial agent (e.g., an antibacterial agent), and combinations thereof.

Embodiment 26C is the two-part reactive composition of embodiment 25C, wherein the polyethylene glycol has a weight average molecular weight ($M_w$) in a range of 200 to 2,000 daltons.

Embodiment 27C is the two-part reactive composition of any one of embodiments 1C to 26C, wherein the first part is present in a first chamber of a multi-chambered mixing and/or dispensing device, and the second part is present in a second chamber of a multi-chambered mixing and/or dispensing device.

Embodiment 28C is the two-part reactive composition of any one of embodiments 1C to 27C wherein the first amine component, the second amine component, or both comprise a blocked and/or protected amino group.

Embodiment 1D is a multi-chambered mixing and/or dispensing device containing the two-part reactive composition of any one of embodiments 1C to 27C, wherein the first part is present in a first chamber of the multi-chambered mixing and/or dispensing device, and the second part is present in a second chamber of the multi-chambered mixing and/or dispensing device.

Embodiment 1E is a dual barreled syringe containing the two-part reactive composition of any one of embodiments 1C to 27C, wherein the first part is present in a first barrel of a dual barreled syringe, and the second part is present in a second barrel of a dual barreled syringe.

Embodiment 1F is a method of preparing a polymeric material comprising: providing a two-part reactive composition according to any one of embodiments 1C to 27C; and combining the first part and the second part under conditions effective for the reaction of the first part and the second part to form the polymeric material.

Embodiment 2F is the method of embodiment 1F, wherein conditions effective for the reaction of the first part and the second part to form the polymeric material comprise room temperature or body temperature.

Embodiment 3F is the method of embodiment 1F or 2F, wherein combining the first part and the second part comprises mixing the first part and the second part.

Embodiment 1G is a polymeric material preparable by a method according to any one of embodiments 1F to 3F.

Embodiment 1H is a polymeric material prepared by a method according to any one of embodiments 1F to 3F.

Objects and advantages of this disclosure are further illustrated by the following non-limiting examples, but the particular materials and amounts thereof recited in these examples, as well as other conditions and details, should not be construed to unduly limit this disclosure.

EXAMPLES

TABLE 1

List of materials

| Component Abbreviation | Chemical Description | Chemical Source | Equivalent Weight |
|---|---|---|---|
| C18Acr | C18 acrylate material* | Preparation described below* | |
| DEO | Diethyl oxalate | Alfa Aesar, Ward Hill, MA | 73 |
| PEI | Polyethylenimine | Polysciences, Inc., Warminster, PA | 43 (all amines), 172 (primary amines) |
| PRIAMINE 1075 | C36 Dimer diamine | Croda, Edison, NJ | 270 |
| HD | 1,6-Hexanediamine | Sigma-Aldrich, Milwaukee, WI | 58 |
| TRIS | Tris(2-aminoethyl) amine | Sigma-Aldrich, Milwaukee, WI | 48.7 |
| T-403 | Jeffamine polyoxypropylene triamine | Huntsman, The Woodlands, TX | 152 |
| IPDA | Isophoronediamine, Epicure 3300 | Momentive, Columbus, OH | 85 |
| TCD | Octahydro-4,7-methano-1H-indenedimethylamine | Oxea Corporation, Dallas, TX | 97 |
| XTA-801 | 1,4-dimethylcyclohexylene amines | Huntsman, The Woodlands, TX | 114 |
| MXDA | Meta-xylylenediamine | Sigma-Aldrich, Milwaukee, WI | 68 |
| TTD | 4,7,10-Trioxatridecane-1,13-diamine | BASF, Florham Park, NJ | 110 |
| RFD-270 | Cycloaliphatic polyether diamine | Huntsman, The Woodlands, TX | 135 |
| EDR-176 | Ethyleneglycol-bispropylamine | Huntsman, The Woodlands, TX | 88 |
| ED | Ethylene diamine | Sigma-Aldrich, Milwaukee, WI | 30 |
| VDM | Vinyl dimethyl azlactone | 3M, St. Paul, MN | — |
| VAZO 67 | 2,2'-Asobis(2-methylbutanenitrile) | DuPont, Wilmington, DE | — |
| IOTG | Isooctyl thioglycolate | Evans Chemetics LP, Teaneck, NJ | — |

*The C18 acrylate material was synthesized by generally following Method 1 of U.S. Pat. No. 8,137,807 and using ISOFOL 18T (available from Sasol) as the starting alkanol. The resulting C18 acrylate material had an approximate distribution of 16% C16, 47% C18 and 32% C20, as determined by Gas Chromatography.

COMPARATIVE EXAMPLES

Comparative Example 1

Polyethyleneimine 1200 (1.2 grams) was weighed into an aluminum pan. Diethyloxalate (DEO, 0.072 grams, d=1.076 g/mL, 67 µL) was added by micropipette. The mixture was stirred rapidly using a wooden stir stick. Within 30 seconds, the mixture became partially gelled. Mixing was continued for several minutes, then the mixture was allowed to stand. After several hours, the mixture remained a sticky, flowable gelatinous mass. Little change was observed after allowing the mixture to stand over the weekend. This is not too surprising since 1.2 grams of PEI corresponds to 28 milliequivalents of total amine (amine equiv weight=43), of which 7 mequiv is primary amine and 14 mequiv is secondary amine, while only 1 mequiv of DEO was added.

Comparative Example 2

Polyethyleneimine 1200 (1.2 grams, 7 mequiv primary amine, 21 mequiv primary plus secondary amine) was mixed with varying amounts of DEO, as described in Comparative Example 1, and the results are described in Table 2.

TABLE 2

Results of Comparative Example 2
DEO (milliequivalents)

| 5 | 10 | 15 | 20 |
|---|---|---|---|
| Soft, sticky, nonflowable gel | Soft, sticky, nonflowable gel | Harder, nonsticky gel; not very strong | Hard, tougher gel; not very strong |

Comparative Example 3

Jeffamine T-403 (equivalent weight 152, 4.236 grams, 28 mequiv) was mixed with varying amounts of DEO, as described in Comparative Example 2. Reaction appeared to be fairly slow, and the results observed after several days standing are described in Table 3.

TABLE 3

Results of Comparative Example 3
DEO (milliequivalents)

| 1 | 5 | 10 | 15 | 20 | 30 | 40 |
|---|---|---|---|---|---|---|
| Viscous liquid | Viscous liquid | Some evidence of gellation | More evidence of gellation | Crosslinked, sticky gel; could be removed from pan as a single solid piece | Some evidence of gelation, but flowable again | Some evidence of gelation, but flowable again |

Comparative Example 4

A 72:28 wt/wt mixture of PEI 1200 and Jeffamine T-403 was prepared to provide a mixture having a primary amine equivalent weight of approximately 73. This amine mix (1.2 grams) was mixed with varying amounts of DEO, as described in Comparative Example 2. All reacted fairly fast, with gelation times of <30 seconds, and the results are described in Table 4. Comparative Example 4 was repeated with PEI 600, with similar results.

TABLE 4

Results of Comparative Example 4
DEO (grams)

| 0.4 | 0.6 | 0.8 | 1.0 | 1.2 | 2.4 |
|---|---|---|---|---|---|
| Soft, rubbery gel | Rubbery gel, a bit tougher | Harder, tougher, flexible gel; not strong | Harder, tougher, flexible gel; not strong | Harder, tougher, flexible gel; not strong | Softer, flexible gel; some uncured liquid left |

Comparative Example 5

A double barrel syringe was loaded with the amine mix from Comparative Example 4 (1.2 grams) in one barrel and DEO (0.6 grams) plus ethanol (0.6 grams) in the second barrel. A mixing tip and a plunger were attached to the syringe, and the contents of the syringe were expelled into an aluminum pan. It appeared that the contents were well mixed, and the mixture in the pan crosslinked quickly. After the ethanol was allowed to evaporate, a fairly flexible film was formed. However the film was not very strong and was easily torn or broken by bending.

Comparative Example 6

Jeffamine T-403 (1.52 grams) and DEO (0.99 grams) were mixed in a small vial. A mild exotherm ensued. $^1$H-NMR analysis indicated a mixture of oxalate end-capped Jeffamine and unreacted DEO. This mixture was loaded into one barrel of a double barrel syringe, and an equivalent volume of PEI 1200 was loaded into the second barrel. A mixing tip and a plunger were attached to the syringe, and the contents of the syringe were expelled into an aluminum pan. The extruded mixture rapidly crosslinked (about 10 seconds) to form a clear, flexible gel, although it was not very strong.

General Procedure for the Evaluation of Film-Forming Ability and Properties of Cured Compositions:

Solutions of each of the reactive components were prepared in methanol at a concentration of 1 milliequivalent/mL of solution. For the PEI component, the solution was prepared such that it contained 1 milliequivalent of primary amine per mL of solution.

Comparative Example 7

Methanolic solutions of PEI 1200 (5 mL, 5 milliequivalents) were mixed in 15 mL centrifuge tubes with varying amounts of methanol DEO solution (1, 2, 3, and 5 mL, respectively). The centrifuge tubes were capped and placed on a rocking mixer. No gelation occurred overnight. The solutions were poured into aluminum weighing pans to evaporate the methanol, then placed in an oven at 40° C. for 4 hours. This experiment indicates that DEO/PEI mixtures, when well mixed, will form a crosslinked film only if they are mixed in approximately equivalent ratios. Results are listed in Table 5.

TABLE 5

Results of Comparative Example 7
DEO Solution (mL)

| 1 | 2 | 3 | 5 |
|---|---|---|---|
| Gooey liquid | Gooey, viscous liquid | Gooey, much more viscous liquid | Hard film |

EXAMPLES

Examples 1A-1R

Various ratios of ester component: amine component were prepared by mixing appropriate amounts of the methanol solutions, and pouring the mixtures into aluminum weighing pans. The solvent was allowed to evaporate at ambient temperature for at least two days. The resultant crosslinked films were given a qualitative rating of 1 (poor) to 5 (good) in Table 6, shown below. A rating of 1 means that the crosslinked material either cracked upon drying, or was very brittle and could not be removed from the pan without breaking into small pieces; a rating of 3 means that the film could be removed from the pan in one piece, but that it would easily break upon flexing or bending; and a rating of 5 means that the film was fairly tough and could withstand flexing without breaking after removal from the pan. In general, the PRIAMINE containing films were fairly flexible, whereas the HD and TRIS containing films were harder and more brittle. Examples 1A-1R were repeated, except that PEI 1200 was replaced by PEI 10,000. Similar films were obtained, but in general they appeared to be a bit more brittle than those derived from PEI 1200.

TABLE 6

Results of Example 1A-1R (Each component is shown in equivalents)

| Ex. | DEO | PEI 1200 | T-403 | PRIAMINE 1075 | HD | TRIS | Qualitative Rating |
|---|---|---|---|---|---|---|---|
| 1A | 4 | 2 | 1 | 1 | — | — | 5 |
| 1B | 5 | 2 | 1 | 2 | — | — | 5 |
| 1C | 5 | 2 | 2 | 1 | — | — | 4 |
| 1D | 5 | 3 | 1 | 1 | — | — | 4 |
| 1E | 3 | 1 | 1 | 1 | — | — | 5 |
| 1F | 5 | 1 | 1 | 1 | — | — | 3 |
| 1G | 4 | 2 | 1 | — | 1 | — | 5 |
| 1H | 5 | 2 | 1 | — | 2 | — | 3 |
| 1I | 5 | 2 | 2 | — | 1 | — | 4 |
| 1J | 5 | 3 | 1 | — | 1 | — | 5 |
| 1K | 3 | 1 | 1 | — | 1 | — | 3 |
| 1L | 5 | 1 | 1 | — | 1 | — | 3 |
| 1M | 4 | 2 | 1 | — | — | 1 | 3 |
| 1N | 5 | 2 | 1 | — | — | 2 | 4 |
| 1O | 5 | 2 | 2 | — | — | 1 | 5 |
| 1P | 5 | 3 | 1 | — | — | 1 | 5 |
| 1Q | 3 | 1 | 1 | — | — | 1 | 3 |
| 1R | 5 | 1 | 1 | — | — | 1 | 2 |

Examples 2A-2H

Various ratios of ester component: amine component were prepared by mixing appropriate amounts of the methanol solutions of DEO, PRIAMINE 1075, and PEI 1200 or PEI 10,000, and pouring the mixtures into aluminum weighing pans. The solvent was allowed to evaporate at ambient temperature for at least two days. The resultant crosslinked films were given a qualitative rating of 1 (poor) to 5 (good) in Tables 7 and 8, below.

TABLE 7

Results of Examples 2A-2D (Each component is shown in equivalents)

| Ex. | DEO | PEI 1200 | PRIAMINE 1075 | Rating | Comments |
|---|---|---|---|---|---|
| 2A | 4 | 2 | 2 | 5+ | tears easily |
| 2B | 3 | 2 | 1 | 5 | tears easily |
| 2C | 4 | 3 | 1 | 5 | tears easily |
| 2D | 4 | 1 | 1 | 2 | brittle, crumbly |

TABLE 8

Results of Examples 2E-2H (Each component is shown in equivalents)

| Ex. | DEO | PEI 10,000 | PRIAMINE 1075 | Rating | Comments |
|---|---|---|---|---|---|
| 2E | 4 | 2 | 2 | 4 | leathery, tears easily |
| 2F | 3 | 2 | 1 | 3 | Leathery |
| 2G | 4 | 3 | 1 | 5 | Leathery |
| 2H | 4 | 1 | 1 | 1 | Crumbly |

Examples 3A-3F

Three component formulations were prepared by mixing methanol solutions of DEO (4 equivalents), PEI 1200 (3 equivalents) and the short chain amine (1 equivalent) listed in Table 9. Films were prepared and rated as described in Examples 1-2. When a drop of DI water was placed on these films, they would swell considerably and rapidly absorb water, indicative of their hydrophilicity. By contrast, those films prepared in the Examples 1-2 that contained PRI-AMINE as part of the amine component were much more hydrophobic; the drop of water remained beaded and not absorbed when dropped onto their surface.

TABLE 9

Results of Examples 3A-3F

| Ex. | Short chain amine | Rating | Comments |
|---|---|---|---|
| 3A | HD | 5+ | Very stretchy, slightly tacky |
| 3B | TRIS | 5 | Stretchy, flexible |
| 3C | XTA-801 | 2 | Brittle film |
| 3D | MXDA | 2 | Brittle |
| 3E | TTD | 2 | Brittle film |
| 3F | RFD-270 | 3 | Flexible, but brittle film |

Examples 4A-4G

Example 4 formulations were prepared by mixing methanol solutions of DEO (5 equivalents), PEI 1200 (2 equivalents), PRIAMINE 1075 (2 equivalents) and the short chain amine (1 equivalent) listed in Table 10. Films were prepared as described in Examples 1-3, and tested for tensile and elongation.

TABLE 10

Results for Examples 4A-4G

| Example Number | 4A | 4B | 4C | 4D | 4E | 4F | 4G |
|---|---|---|---|---|---|---|---|
| Short chain amine | XTA-801 | MXDA | TTD | RFD-270 | HD | TRIS | ED |
| Tensile (Kgf) | 0.90 | 0.89 | 0.34 | 0.75 | 0.91 | 0.65 | 1.04 |
| Elongation (%) | 92 | 108 | 103 | 97 | 75 | 114 | 204 |

Examples 5A-5D

Example 5 formulations were prepared by mixing methanol solutions of DEO (5 equivalents), PEI 1200 (2 equivalents), PRIAMINE 1075 (2 equivalents) and HD (1 equivalent). In some formulations, octanoic acid (available from Sigma-Aldrich) was added to the methanol solution of PEI to protonate a certain percentage (5%, 10%, or 25%) of the total amine content. Films were prepared as described above and tested for tensile and elongation.

TABLE 11

Results for Examples 5A-5D

| Example Number | 5A | 5B | 5C | 5D |
|---|---|---|---|---|
| % Octanoic acid | 0 | 5 | 10 | 25 |
| Tensile (Kgf) | 0.91 | 0.84 | 0.72 | 0.22 |
| Elongation (%) | 73 | 187 | 167 | 273 |

Examples 6A-6D

Example 6 formulations were prepared by mixing various ratios of methanol solutions of DEO:PEI 1200 (25% neutralized with octanoic acid):PRIAMINE 1075:HD. Films were prepared as described above and tested for tensile and elongation.

TABLE 12

Results for Examples 6A-6D [table format changed from above]

| Example Number | 6A | 6B | 6C | 6D |
|---|---|---|---|---|
| Equivalent Ratio of components DEO:PEI:PRIAMINE:HD | 5:2.5:2:0.5 | 5:2:2:1 | 5:1.5:2:1.5 | 5:1:2:2 |
| Tensile (Kgf) | 0.089 | 0.22 | 1.16 | 1.23 |
| Elongation (%) | 807 | 273 | 593 | 127 |

Examples 7A-7BH

Examples Using ED as Short Chain Diamine

In some of the formulations of Example 7, polyethyleneglycol 200 was added to improve compatibility of the various components. Tables 13-18 show the results for data obtained for Example 7 formulations consisting of DEO, PEI 1200 (5% titrated with octanoic acid), PRIAMINE 1075, ED, and various amounts of PEG 200. Additional Example 7 samples were prepared with untitrated PEI 1200, and with PEI 1200 10% and 25% titrated with octanoic acid (OA). The results of these additional Example 7 samples with various titration amounts of octanoic acid were similar to the results shown in Tables 13-18.

TABLE 13

Results of Examples 7A-7J (Each component is shown in equivalents)

| Ex. | DEO | PEI-1200, octanoic acid 5% | PRIAMINE 1075 | ED | PEG 200 | Tensile (grams force) | % Elongation |
|---|---|---|---|---|---|---|---|
| 7A | 5 | 2.5 | 2 | 0.5 | 0 | 397.9 | 200 |
| 7B | 5 | 2 | 2 | 1 | 0 | 998.8 | 151 |
| 7C | 5 | 1.5 | 2 | 1.5 | 0 | 1762.2 | 141 |
| 7D | 5 | 1 | 2 | 2 | 0 | No Film | No Film |
| 7E | 5 | 0.5 | 2 | 2.5 | 0 | No Film | No Film |
| 7F | 5 | 1 | 2 | 1 | 0 | No Film | No Film |
| 7G | 5 | 2 | 2 | 0.5 | 0 | 1452.8 | 285 |
| 7H | 5 | 0.5 | 2 | 1 | 0 | No Film | No Film |
| 7I | 4.5 | 2 | 2 | 0.5 | 0 | 615.7 | 175 |
| 7J | 3.5 | 0.5 | 2 | 1 | 0 | No Film | No Film |

TABLE 14

Results of Examples 7K-7T (Each component is shown in equivalents)

| Ex. | DEO | PEI-1200, octanoic acid 5% | PRIAMINE 1075 | ED | PEG 200 | Tensile (grams force) | % Elongation |
|---|---|---|---|---|---|---|---|
| 7K | 5 | 2.5 | 2 | 0.5 | 0.1 | 495.6 | 179 |
| 7L | 5 | 2 | 2 | 1 | 0.1 | 505.7 | 255 |
| 7M | 5 | 1.5 | 2 | 1.5 | 0.1 | 774.4 | 73 |
| 7N | 5 | 1 | 2 | 2 | 0.1 | No Film | No Film |
| 7O | 5 | 0.5 | 2 | 2.5 | 0.1 | No Film | No Film |
| 7P | 5 | 1 | 2 | 1 | 0.1 | No Film | No Film |
| 7Q | 5 | 2 | 2 | 0.5 | 0.1 | 1112.7 | 249 |
| 7R | 5 | 0.5 | 2 | 1 | 0.1 | No Film | No Film |
| 7S | 4.5 | 2 | 2 | 0.5 | 0.1 | 498.2 | 161 |
| 7T | 3.5 | 0.5 | 2 | 1 | 0.1 | No Film | No Film |

TABLE 15

Results of Examples 7U-7AD (Each component is shown in equivalents)

| Ex. | DEO | PEI-1200, octanoic acid 5% | PRIAMINE 1075 | ED | PEG 200 | Tensile (grams force) | % Elongation |
|---|---|---|---|---|---|---|---|
| 7U | 5 | 2.5 | 2 | 0.5 | 0.25 | 499.6 | 159 |
| 7V | 5 | 2 | 2 | 1 | 0.25 | 855.2 | 133 |
| 7W | 5 | 1.5 | 2 | 1.5 | 0.25 | 1547.9 | 183 |
| 7X | 5 | 1 | 2 | 2 | 0.25 | No Film | No Film |
| 7Y | 5 | 0.5 | 2 | 2.5 | 0.25 | No Film | No Film |
| 7Z | 5 | 1 | 2 | 1 | 0.25 | 991.8 | 5 |
| 7AA | 5 | 2 | 2 | 0.5 | 0.25 | 791.6 | 160 |
| 7AB | 5 | 0.5 | 2 | 1 | 0.25 | No Film | No Film |
| 7AC | 4.5 | 2 | 2 | 0.5 | 0.25 | 551.4 | 189 |
| 7AD | 3.5 | 0.5 | 2 | 1 | 0.25 | No Film | No Film |

TABLE 16

Results of Examples 7AE-7AN (Each component is shown in equivalents)

| Ex. | DEO | PEI-1200, octanoic acid 5% | PRIA-MINE 1075 | ED | PEG 200 | Tensile (grams force) | % Elong-ation |
|---|---|---|---|---|---|---|---|
| 7AE | 5 | 2.5 | 2 | 0.5 | 0.5 | 267.3 | 184 |
| 7AF | 5 | 2 | 2 | 1 | 0.5 | 628.7 | 220 |
| 7AG | 5 | 1.5 | 2 | 1.5 | 0.5 | 968.6 | 45 |
| 7AH | 5 | 1 | 2 | 2 | 0.5 | No Film | No Film |
| 7AI | 5 | 0.5 | 2 | 2.5 | 0.5 | No Film | No Film |
| 7AJ | 5 | 1 | 2 | 1 | 0.5 | 1200.1 | 11 |
| 7AK | 5 | 2 | 2 | 0.5 | 0.5 | 872.1 | 231 |
| 7AL | 5 | 0.5 | 2 | 1 | 0.5 | No Film | No Film |
| 7AM | 4.5 | 2 | 2 | 0.5 | 0.5 | 412.1 | 119 |
| 7AN | 3.5 | 0.5 | 2 | 1 | 0.5 | No Film | No Film |

TABLE 17

Results of Examples 7AO-7AX (Each component is shown in equivalents)

| Ex. | DEO | PEI-1200, octanoic acid 5% | PRIA-MINE 1075 | ED | PEG 200 | Tensile (grams force) | % Elong-ation |
|---|---|---|---|---|---|---|---|
| 7AO | 5 | 2.5 | 2 | 0.5 | 1 | 263.2 | 132 |
| 7AP | 5 | 2 | 2 | 1 | 1 | 532.5 | 153 |
| 7AQ | 5 | 1.5 | 2 | 1.5 | 1 | 1176.3 | 137 |
| 7AR | 5 | 1 | 2 | 2 | 1 | No Film | No Film |
| 7AS | 5 | 0.5 | 2 | 2.5 | 1 | No Film | No Film |
| 7AT | 5 | 1 | 2 | 1 | 1 | 1278.2 | 17 |
| 7AU | 5 | 2 | 2 | 0.5 | 1 | 651.2 | 168 |
| 7AV | 5 | 0.5 | 2 | 1 | 1 | No Film | No Film |
| 7AW | 4.5 | 2 | 2 | 0.5 | 1 | 310.2 | 83 |
| 7AX | 3.5 | 0.5 | 2 | 1 | 1 | No Film | No Film |

TABLE 18

Results of Examples 7AY-7BH (Each component is shown in equivalents)

| Ex. | DEO | PEI-1200, octanoic acid 5% | PRIA-MINE 1075 | ED | PEG 200 | Tensile (grams force) | % Elong-ation |
|---|---|---|---|---|---|---|---|
| 7AY | 5 | 2.5 | 2 | 0.5 | 2 | 208.3 | 105 |
| 7AZ | 5 | 2 | 2 | 1 | 2 | 367 | 89 |
| 7BA | 5 | 1.5 | 2 | 1.5 | 2 | 728.9 | 96 |
| 7BB | 5 | 1 | 2 | 2 | 2 | No Film | No Film |
| 7BC | 5 | 0.5 | 2 | 2.5 | 2 | No Film | No Film |
| 7BD | 5 | 1 | 2 | 1 | 2 | No Film | No Film |
| 7BE | 5 | 2 | 2 | 0.5 | 2 | 500.6 | 113 |
| 7BF | 5 | 0.5 | 2 | 1 | 2 | No Film | No Film |
| 7BG | 4.5 | 2 | 2 | 0.5 | 2 | 204.1 | 62 |
| 7BH | 3.5 | 0.5 | 2 | 1 | 2 | No Film | No Film |

Several Example 7 formulations in Tables 13-18 indicate that "No Film" was formed. This was due to rapid crystallization or phase separation as the solvent evaporated. Most of these formulations, however, were still useful as adhesives when formulated as solventless materials and dispensed with appropriate mixing equipment, such as with a double barrel syringe.

Additional Example 7 formulations were prepared (no table) from DEO, PEI 1200 (0%, 5%, 10%, 25% titrated with octanoic acid), PRIAMINE, and the following short chain amines: HD, TRIS, MXDA, TTD, XTA-801, RFD-270, IPDA, EDR-176, and TCD. The resulting films obtained exhibited tensile strengths ranging from 27 to 2283 grams force with elongations ranging from 6% to 807%.

Further additional Example 7 formulations (no table), were prepared in which PRIAMINE 1075 was replaced with PRIAMINE 1071, PRIAMINE 1073, or PRIAMINE 1074. The resulting films of these additional Example 7 formulations exhibited tensile strengths and elongation similar to those in Tables 13-18.

Examples 8A-8D: PEI Titrated with Isostearic Acid

Example 8 formulations were prepared as described in Example 7, except that PEI 1200 was titrated with isostearic acid rather than octanoic acid. Films obtained by casting out of methanol solution were evaluated for tensile and elongation, as previously described. The films formed with Examples 8A-8D were extremely tough and stronger than the corresponding Example 7 formulations using octanoic acid, indicating that one can control physical properties by choice of neutralizing acid.

TABLE 19

Results of Examples 8A-8D (Each component is shown in equivalents)

| Ex. | DEO | PEI-1200, isostearic acid 5% | PRIA-MINE 1075 | ED | PEG 200 | Tensile (grams force) | % Elong-ation |
|---|---|---|---|---|---|---|---|
| 8A | 5 | 2.5 | 2 | 0.5 | 0.1 | 897.2 | 267 |
| 8B | 5 | 2 | 2 | 1 | 0.1 | 1168.5 | 145 |
| 8C | 5 | 2 | 2 | 0.5 | 0.1 | 1821.6 | 167 |
| 8D | 4.5 | 2 | 2 | 0.5 | 0.1 | 795 | 107 |

Examples 9A-9E. Incorporation of Polyamine-Functional Acrylate

To a 250 ml amber bottle was added C18Acr (44.1 g), VDM (0.90 g), IOTG (1.125 g) and Vazo 67 (0.090 g). Ethyl acetate was added to the final composition to provide 30% solids. The components of the bottle were thoroughly degassed using nitrogen, then sealed. The reaction was conducted in a LAUNDER-OMETER at 65° C. for 24 hrs. The bottle was removed from the LAUNDER-OMETER and an additional amount of Vazo 67 (0.045 g) was added under inert conditions. The reaction was continued in the LAUNDER-OMETER at 65° C. for an additional 24 hrs. Ethyl acetate was removed from the resulting product using a rotary evaporator and the resulting polymer (40 g, 5.75 e$^{-2}$ mol VDM) was dissolved in 80 mL THF in preparation for the post-functionalization reaction. The copolymer was then added dropwise at room temperature to a stirred solution of 1,3-propanediamine (42.6 g, 5.75 e$^{-1}$ mol) in 10 ml THF. After 10 minutes, the solution was heated to 80° C. under vacuum to remove the solvent. The excess diamine was removed by precipitation into acetonitrile. Purification of the copolymer was conducted by slowly adding the polymer solution to a rapidly stirred beaker containing acetonitrile (500 mL). The clear, colorless copolymer was allowed to settle and the solvent was decanted. The copolymer was dried under vacuum at 65° C. and the procedure was repeated three additional times to remove residual impurities.

This prepared polyamine-functional acrylate (approximately 0.69 g/meq of amine, 3.09 grams) was referred to as "Prep 9", and was dissolved in toluene (7.65 grams) to prepare a 28.8% wt/wt solution. This solution was used to prepare several casting solutions as described in Example 7, according to Table 20. Films were cast from each Example 9 formulation. All Example 9 formulations produced rubbery, flexible film materials, indicative of their potential utility as adhesives.

TABLE 20

Results of Examples 9A-9E (Each component is shown in equivalents)

| Example Number | DEO | PEI 1200, 25% titrated with octanoic acid | PRIAMINE 1075 | Ethylene-diamine | "Prep 9", equiv (grams of 28.8% wt/wt solution) |
|---|---|---|---|---|---|
| 9A | 5 | 2 | 2 | 1 | 0 (0) |
| 9B | 5 | 1.75 | 2 | 1 | 0.25 (0.60) |
| 9C | 5 | 1.5 | 2 | 1 | 0.5 (1.21) |
| 9D | 5 | 1 | 2 | 1 | 1 (2.41) |
| 9E | 5 | 0 | 2 | 1 | 2 (4.83) |

Example 10: Screening of Surfactants and Compatibilizers

PEI 1200 (10 grams) and PRIAMINE 1075 (10 grams) were added to a screw-top glass vial to produce a two-phase mixture. An additive (surfactant or compatibilizer, 1 gram) was added to evaluate miscibility. A small magnetic stir bar was added to the vial, the vial was capped, and then the mixture was warmed on a hot plate with stirring to obtain an intimate mixture. The mixture was removed from the hot plate, vortexed for several seconds, then allowed to stand at ambient temperature. The mixture was inspected visually after standing overnight (approximately 18 hours), with the following results.

Example 11: Preparation of 100% Solids, Two-Part Adhesives

Two part adhesive formulations were prepared such that, when mixed, they would consist of oxalate ester (6 equivalents), PEI 1200 (2 equivalents), PRIAMINE 1075 (2 equivalents), and short chain amine (1 equivalent). A compatibilizing additive was used to adjust the two parts to be of equal weight.

Part A: DEO (1 gram) was mixed with PRIAMINE 1075 (1.23 grams)

Part B: PEI 1200 (0.79 gram) was mixed with TRIS (0.11 gram) and PEG 200 (1.33 grams)

TABLE 21

Results of Example 10

| Result | Additive | Source |
|---|---|---|
| Completely miscible | Polyethyleneglycol 200 | Sigma-Aldrich, Milwaukee, WI, USA |
| | Polyethyleneglycol 400 | Sigma-Aldrich, Milwaukee, WI, USA |
| | PRIPOL 2033 Dimer Diol | Croda, Edison, NJ, USA |
| | Glyceryl monoisostearate | Lubrizol, Wickliffe, OH, USA |
| Nearly miscible | TBC, NF (Tributyl citrate) | Morflex Inc., Greensboro, NC, USA |
| | ESTOL1526 | Unichema International, Spain |
| | EUTANOL G | Cognis, Monheim am Rhein, Germany |
| | SPAN 80 | TCI America, Portland, OR, USA |
| | BRIJ-L4-LQ-AP | Croda, Edison, NJ, USA |
| Immiscible | CARBOWAX 750 | Dow Chemical Co., Midland MI, USA |
| | 2-8566 Amino Fluid | Dow Corning, Midland, MI, USA |
| | Triethyl citrate | Morflex Inc., Greensboro, NC, USA |
| | Dibutyl Sebacate | Unichema International, Spain |
| | Isopropyl Isostearate | Unichema International, Spain |
| | Glycerol Tricaprylate/Caprate | Unichema International, Spain |
| | PRIPURE 3759 | Unichema International, Spain |
| | ABIL QUAT 3272 | Evonik-Goldschmidt, Germany |
| | Lauryl Pyrrolidone | ISP technologies, Waterford Twp, MI, USA |
| | COSCAP G-7MC | Phoenix Chemical Inc., Somerville, NJ, USA |
| | PEL-SIL AMOD | Elé Corporation, McCook, IL, USA |
| | RHODACAL DS-10 | Rhodia, La Défense, France |
| | GLUCOPAN 225 DK | BASF, Florham Park, NJ, USA |
| | GLUCOPAN 215 UP | BASF, Florham Park, NJ, USA |
| | GLUCOPAN 425 N | BASF, Florham Park, NJ, USA |
| | GLUCOPAN 625 UP | BASF, Florham Park, NJ, USA |
| | PLANTACARE 818 UP | BASF, Florham Park, NJ, USA |
| | PRIPLAST 3190 | Croda, Edison, NJ, USA |
| | SPAN 120 LQ (Sorbitan isostearate) | Croda, Edison, NJ, USA |
| | PRIPLAST 3196 | Croda, Edison, NJ, USA |
| | Cholesterol | Sigma-Aldrich, Milwaukee, WI, USA |
| | NIKKOL-TL-40 | Nikko Chemicals, Tokyo, Japan |

A double barrel syringe was loaded with Part A in one barrel and Part B in the second barrel. A mixing tip and a plunger were attached to the syringe, and the contents of the syringe were expelled into an aluminum pan. It appeared that the contents were well mixed, and the mixture in the pan crosslinked quickly at room temperature conditions to provide a tough, non-tacky gel, a suitable adhesive for many different applications.

Similar results were obtained by substituting PEG 400, glyceryl monoisostearate or Pripol 2033 for the PEG 200.

When TRIS was replaced with MXDA, IPDA, TCD, or TTD, rapid crosslinking still occurred, but the final gel was quite tacky, possibly due to the large amount of nonreactive additive.

Examples 12A-12E: Preparation of 100% Solids, Two-Part Adhesives and Application to Rigid Substrates Two part adhesive formulations were prepared in the same manner as Example 11, with low amounts of additive, according to Table 22. A double barrel syringe was loaded with Examples 12A-12E: Part A in one barrel and Part B in the second barrel. A mixing tip and a plunger were attached to the syringe. The mixed adhesive was applied to test panels of various substrates and evaluated for overlap shear adhesion according to the Overlap Shear Adhesion Test Method described in U.S. Pat. No. 8,729,197 (Kropp, 3M). Shear strength (lbf/in$^2$) is reported in Table 23.

TABLE 22

Preparation of Examples 12A-12E

| | Part A | | Part B | | | | |
|---|---|---|---|---|---|---|---|
| Example Number | DEO | PRIA-MINE 1075 | PEI 1200, 5% OA | PEI 1200, 25% OA | PRIA-MINE 1075 | ED | PEG 200 |
| 12A | 5.00 | 4.88 | 6.88 | — | 2.52 | 0.20 | 0.25 |
| 12B | 5.00 | 4.19 | 5.51 | — | 3.21 | 0.20 | 0.25 |
| 12C | 5.00 | 6.85 | — | 10.82 | 0.55 | 0.20 | 0.25 |
| 12D | 5.00 | 5.75 | — | 8.66 | 1.63 | 0.20 | 0.25 |
| 12E | 5.00 | 4.75 | — | 2.16 | 4.77 | 0.40 | 0.25 |

TABLE 23

Overlap Shear Adhesion Test Results for Examples 12A-12E

| | Substrate | | | |
|---|---|---|---|---|
| Example Number | Fiberglass | PC/ABS | Steel | Nylon |
| 12A | 220 | 24 | 32 | 46 |
| 12B | 204 | 1.4 | 14 | 30 |
| 12C | — | 8 | — | 102 |
| 12D | 290 | 30 | 94 | 100 |
| 12E | 270 | 42 | 46 | 52 |

Example 13: Two-Part Adhesives. Application as Skin Adhesives

The two-part formulations of Examples 12C and 12D were used to close incisions on the backs or knees of pigs. The adhesive displayed good adhesion and flexibility, and ultimately could be peeled off without damage to the skin.

All cited references, patents, or patent applications in the above application are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part reactive composition comprising:
   a) a first part comprising an oxalamido-containing compound and a compound of Formula (IV);
      wherein the oxalamido-containing compound has at least two groups of the formula

—NR$^5$—(CO)—(CO)—OR$^4$;

wherein the groups of the formula —NR$^5$—(CO)—(CO)—OR$^4$ are the reaction products of a first amine component with a compound of Formula (IV);
      wherein the first amine component has at least two and at most three primary amino groups, secondary amino groups, or a mixture thereof;
      wherein the oxalamido-containing compound is free of a siloxane segment; and
      wherein the compound of Formula (IV) is of the formula:

R$^4$O—(CO)—(CO)—OR$^4$     (IV), wherein each R$^4$ is independently alkyl, substituted alkyl, aralkyl, substituted aralkyl, alkenyl, aryl, or substituted aryl; and
      wherein each R$^5$ is independently H, alkyl, substituted alkyl, alkylene, aralkyl, substituted aralkyl, alkenyl, aryl, or substituted aryl; and
   b) a second part comprising a second amine component having (i) greater than three primary amino groups, or (ii) at least three primary amino groups and a plurality of secondary amino groups, wherein the second amine component is a polymeric material having a carbon backbone or a polymeric material having a carbon backbone with a plurality of catenated nitrogen atoms.

2. The two-part reactive composition of claim 1, wherein the first amine component comprises one or more C2-C48 or higher amines.

3. The two-part reactive composition of claim 1, wherein the first amine component comprises one or more C2-C16 amines, and 30 or less equivalent percent of the total amine content of the components for the reaction product forming the polymeric material comprises the one or more C2-C16 amines.

4. The two-part reactive composition of claim 1, wherein the first amine component comprises one or more C17-C48 or higher amines, and 5 to 40 equivalent percent of the total amine content of the components for the reaction product forming the polymeric material comprises the one or more C17-C48 or higher amines.

5. The two-part reactive composition of claim 1, wherein the second amine component comprises a polyethylene imine having a number average molecular weight ($M_n$) of 600 to 100,000 Daltons.

6. The two-part reactive composition of claim 1, wherein the second amine component comprises a Polymer B comprising:
   at least 80 weight percent of a plurality of first monomeric units of Formula (I):

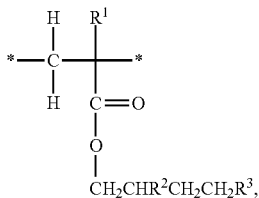 (I)

$CH_2CHR^2CH_2CH_2R^3$, wherein:
each $R^1$ is independently hydrogen or methyl;
each $R^2$ and $R^3$ are independently a linear or branched alkyl having 4 to 14 carbon atoms; and
at least three monomeric units having a primary amino group.

7. The two-part reactive composition of claim 6, wherein Polymer B has a weight average molecular weight ($M_w$) of at least 12,000 Daltons and a weight average molecular weight ($M_w$) of no greater than 100,000 Daltons.

8. The two-part reactive composition of claim 6, wherein a monomeric unit of the plurality of monomeric units of Polymer B having a primary amino group is a reaction product of an amine or a polyamine with a monomeric unit formed from maleic anhydride or a monomeric unit formed from vinyl dimethyl azlactone.

9. The two-part reactive composition of claim 8, wherein the amine is ethylene diamine, propylene diamine, butanediamine, hexanediamine, piperazine, a polyether-amine, a dimer diamine, 3(4),8(9)-bis-(aminomethyl)-tricyclo-[5,2,1,02,6] decane, or a combination thereof; and/or the polyamine is a polyether-amine.

10. The two-part reactive composition of claim 1, wherein 10 to 80 equivalent percent of the total amine content of the components for the reaction product forming the polymeric material comprises the second amine component.

11. The two-part reactive composition of claim 1, further comprising a component selected from the group consisting of a non-ionic surfactant, a polyethylene glycol, a filler, a dye, an antioxidant, a tackifier, a solvent, a diluent, a viscosity modifier, an antimicrobial agent, and combinations thereof.

12. A multi-chambered mixing and/or dispensing device containing the two-part reactive composition of claim 1, wherein the first part is present in a first chamber of the multi-chambered mixing and/or dispensing device, and the second part is present in a second chamber of the multi-chambered mixing and/or dispensing device.

13. A method of preparing a polymeric material comprising:
providing a two-part reactive composition according to claim 1; and
combining the first part and the second part under conditions effective for the reaction of the first part and the second part to form the polymeric material.

14. The method of claim 13, wherein combining the first part and the second part comprises mixing the first part and the second part.

15. The method of claim 13, wherein conditions effective for the reaction of the first part and the second part to form the polymeric material comprise room temperature or body temperature.

* * * * *

UNITED STATES PATENT AND TRADEMARK OFFICE
CERTIFICATE OF CORRECTION

PATENT NO. : 10,196,548 B2  
APPLICATION NO. : 15/781851  
DATED : February 5, 2019  
INVENTOR(S) : Jerald Rasmussen Page 1 of 1

It is certified that error appears in the above-identified patent and that said Letters Patent is hereby corrected as shown below:

In the Specification

Column 6
Line 28, delete "benezene," and insert -- benzene, --, therefor.

Column 9
Lines 47-48, delete "arcryloyloxy" and insert -- acryloyloxy --, therefor.
Line 57, delete "(methy)acryloyl" and insert -- "(meth)acryloyl" --, therefor.
Line 62, delete "(methy)acryloyl" and insert -- "(meth)acryloyl" --, therefor.

Column 10
Line 49, delete "photoinitator" and insert -- photoinitiator --, therefor.

Column 18
Line 46, delete "benezene," and insert -- benzene, --, therefor.

Column 19
Line 2, delete "embodiments" and insert -- embodiment --, therefor.
Line 24, delete "embodiments" and insert -- embodiment --, therefor.

Columns 23-24
Line 61 (approx.), delete "-Asobis(" and insert -- -Azobis( --, therefor.

Columns 25-26
Line 6 (Table 3), delete "gellation" and insert -- gelation --, therefor.
Line 6 (Table 3), delete "gellation" and insert -- gelation --, therefor.

Signed and Sealed this  
Seventh Day of May, 2019

Andrei Iancu  
*Director of the United States Patent and Trademark Office*